US011724431B2

(12) United States Patent
Rosamond, III

(10) Patent No.: US 11,724,431 B2
(45) Date of Patent: Aug. 15, 2023

(54) MODULAR FLUID PROCESSING APPARATUSES, MODULAR COMPONENTS AND RELATED METHODS

(71) Applicant: PSI-Polymer Systems, Inc., Conover, NC (US)

(72) Inventor: James Edgar Rosamond, III, Conover, NC (US)

(73) Assignee: PSI-Polymer Systems, Inc., Conover, NC (US)

(*) Notice: Subject to any disclaimer, the term of this patent is extended or adjusted under 35 U.S.C. 154(b) by 278 days.

(21) Appl. No.: 16/786,406

(22) Filed: Feb. 10, 2020

(65) Prior Publication Data

US 2020/0262125 A1 Aug. 20, 2020

Related U.S. Application Data

(60) Provisional application No. 62/802,846, filed on Feb. 8, 2019.

(51) Int. Cl.
| | |
|---|---|
| *B29C 48/69* | (2019.01) |
| *B29C 48/255* | (2019.01) |
| *B01D 29/52* | (2006.01) |
| *B01D 35/30* | (2006.01) |
| *B01D 35/12* | (2006.01) |
| *B01D 33/01* | (2006.01) |
| *B01D 29/96* | (2006.01) |

(52) U.S. Cl.
CPC .............. *B29C 48/69* (2019.02); *B01D 29/52* (2013.01); *B01D 33/01* (2013.01); *B01D 35/12* (2013.01); *B01D 35/30* (2013.01); *B29C 48/255* (2019.02); *B01D 29/96* (2013.01); *B01D 35/308* (2013.01)

(58) Field of Classification Search
CPC ... B29C 48/69; B29C 48/691; B29C 48/6912; B01D 29/52; B01D 35/12; B01D 35/308
See application file for complete search history.

(56) References Cited

U.S. PATENT DOCUMENTS 5,756,129 A * 5/1998 Yoshii ................ B29C 48/6912
425/185

FOREIGN PATENT DOCUMENTS

WO WO 2005/087476 * 9/2005

* cited by examiner

*Primary Examiner* — Benjamin M Kurtz
(74) *Attorney, Agent, or Firm* — Michael Best & Friedrich LLP

(57) ABSTRACT

Modular fluid processing apparatuses, modular components and related methods are provided. A fluid processing apparatus for use in fluid processing systems can include a housing comprising first body half and a second body halves that are secured together. The first body half has one or more half bores that extend along a length of the first body half and the second body half has one or more half bores that extend along a length of the second body half with the one or more half bores in the first body half aligning with the one or more half bores in the second body half forming one or more full sleeve-receiving bores. The fluid processing apparatus can include one or more sleeves that are securable between the first and second body halves within the one or more sleeve-receiving bores to form piston pathways within the housing for receiving pistons.

20 Claims, 22 Drawing Sheets

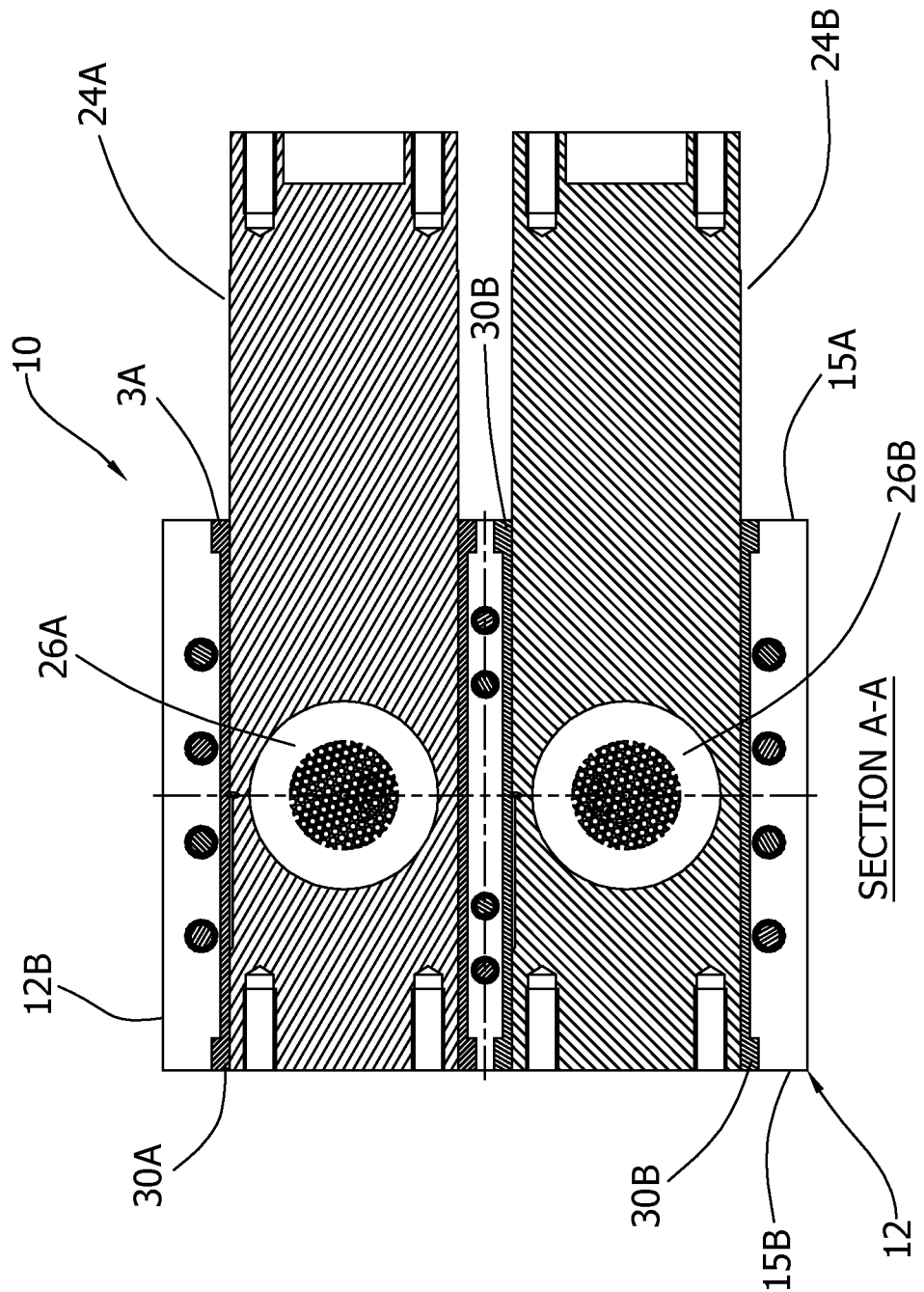

SECTION B-B

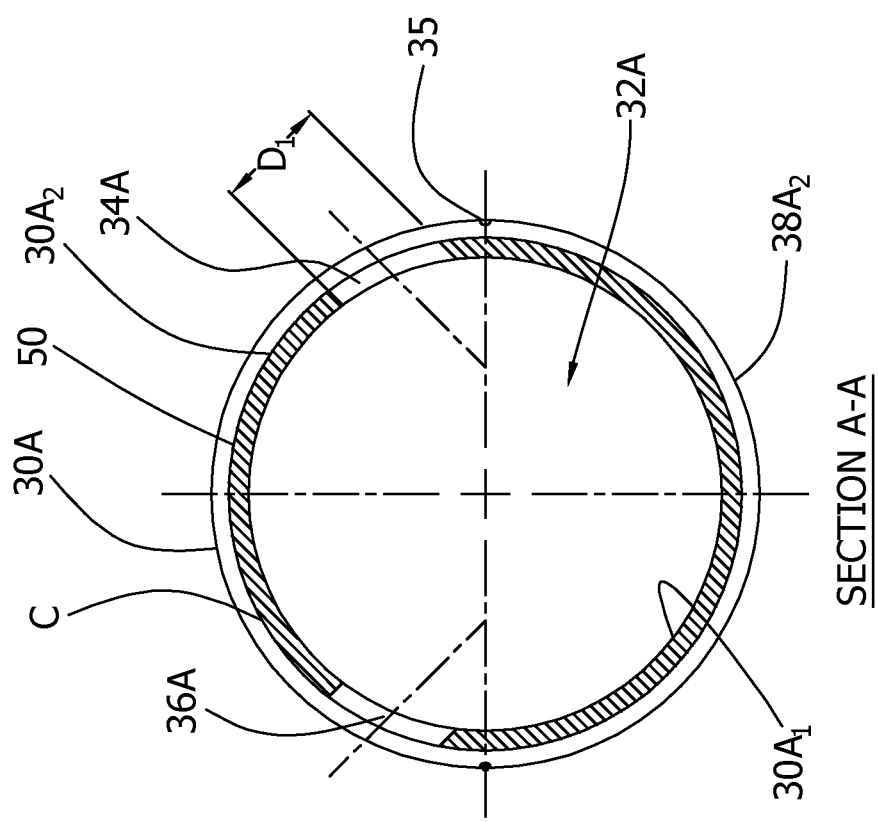

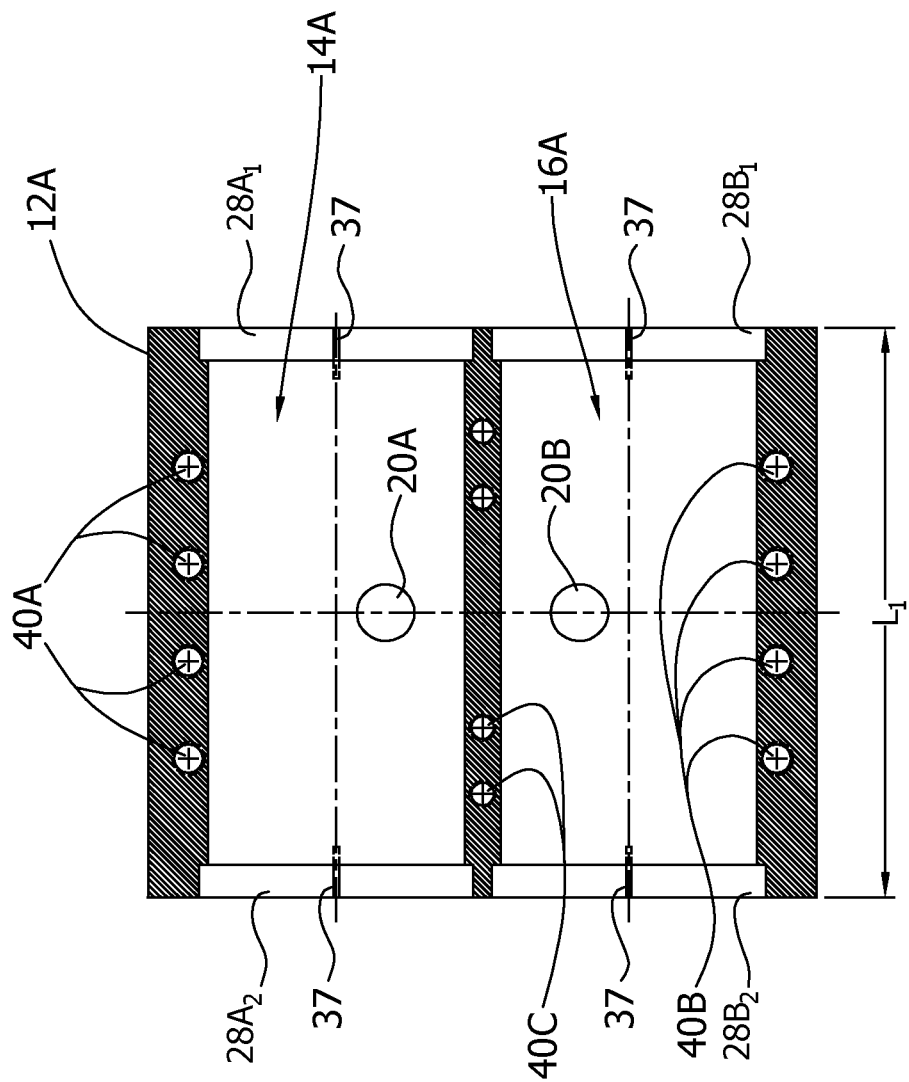

MODULAR FLUID PROCESSING APPARATUSES, MODULAR COMPONENTS AND RELATED METHODS

RELATED APPLICATION

The presently disclosed subject matter claims the benefit of U.S. Provisional Patent Application Ser. No. 62/802,846, filed Feb. 8, 2019, the disclosure of which is incorporated herein by reference in its entirety.

TECHNICAL FIELD

The present subject matter generally relates to modular fluid processing apparatuses used in the filtering and extrusion of fluids. More specifically, the present subject matter relates to modular fluid processing apparatuses, such as screen changers and diverter valves, used in the filtering and extrusion of fluids, including, but not limited to molten polymer, with the modular fluid processing apparatuses comprising changeable modular components that permit easier cleaning and servicing of the modular fluid processing apparatuses and allow for replacement of modular components within the modular fluid processing apparatuses.

BACKGROUND

Polymer extrusion systems are well known and used for applications such as the manufacture of extruded polymer components. In a typical application, polymer feedstock particles are combined and heated in an extruder device to produce a stream of molten polymer. The polymer extrudate is then driven under pressure through a screen changer that filters the polymer before driving the molten polymer to an appropriate downstream module. In a typical polymer processing system, the screen changers include a screen that filters the extrudate to improve its quality and uniformity before passing it through to the die for extrusion into a desirable form such as a sheet, tube, or other form. Such screen changers will include a piston, such as shifter bar, that includes positions for placement of two or more screens along the shifter that permit screens to be changed and/or cleaned, the polymer processing line is allowed to continuously operate. The shifter bar can position a screen within the flow path of the polymer processing line to filter the polymer extrudate passing through the screen. Over a period of time, the screen starts to become clogged with debris such as corroded polymer and foreign material. To prevent the process line from having to stop operation, the shifter bar can be shifted to move a second clean screen into the filtering position within the processing line while the polymer processing line continues operating under heat. The screen changing process needs to occur fairly quickly to prevent the polymer extrudate from sitting stagnant within process line for too long which may lead to a burning of the polymer.

Due to the high pressures and temperatures, current screen changers comprise a block housing that is constructed of a single solitary block of a treated metal that is machined to include the necessary pathways for the respective polymer flows and for the components, such as the shifter bar that are inserted into the block housing. When a blockage occurs within the screen changer block housing, for example, due to a screen changing malfunction or delay, the polymer within the screen changer housing and upstream within the processing line is often ruined which requires that the processing line, including the screen changer must be cleaned out to allow for proper quality polymer to be run again. Such a cleaning process can be costly and time consuming since a boring out of the polymer flow pathways within the housing may be required due to the fact that only access for cleaning is through the pathways themselves within the singular block housing. Due to the tight tolerances, a screen changer can be easily damaged beyond repair during such a cleaning process. Thus, if an extensive blockage occurs or a block housing is damaged during a cleaning process, the entire screen changer will have to be replaced, which can cause a massive delay in production and can be a major capital expense to a polymer processing operation.

In the past, dual bodied screen changer housings were developed to allow for easier cleaning of the screen changer. However, such attempts have not worked due to the fact that the high pressures needed to process the molten polymer and/or the viscosity of the polymer being processed would cause the dual bodied housing to fail due to leakage or other related malfunction.

Thus, it is widely accepted among persons skilled in the art that, despite past efforts, an ongoing need exists to provide modular fluid processing apparatuses that are easier and less time consuming to clean and can be more cheaply repaired.

SUMMARY

The present subject matter provides fluid processing apparatuses used in the filtering and extrusion. More specifically, the present subject matter relates to modular fluid processing apparatuses that comprise changeable modular components that permit easier cleaning and servicing of the modular fluid processing apparatuses and allow for replacement of modular components within the modular fluid processing apparatuses. Methods related to the production and use of the modular fluid processing apparatuses disclosed herein are also provided.

Thus, it is an object of the presently disclosed subject matter to provide modular fluid processing apparatuses and modular fluid processing apparatus components as well as methods related thereto that can facilitate the cleaning and repair of the screen changer. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 2B illustrates a cross-sectional view of the embodiment of the modular continuous screen changer according to FIG. 1 taken along the lines A-A in FIG. 2A;

FIG. 7B illustrates a cross-sectional view of the embodiment of the sleeve that can be used within a screen changer housing according to FIG. 7B taken along the lines A-A in FIG. 7A;

FIG. 8 illustrates a side plan view of an embodiment of a body half of a housing that can be used in a modular continuous screen changer according to the present subject matter.

Figure 1:
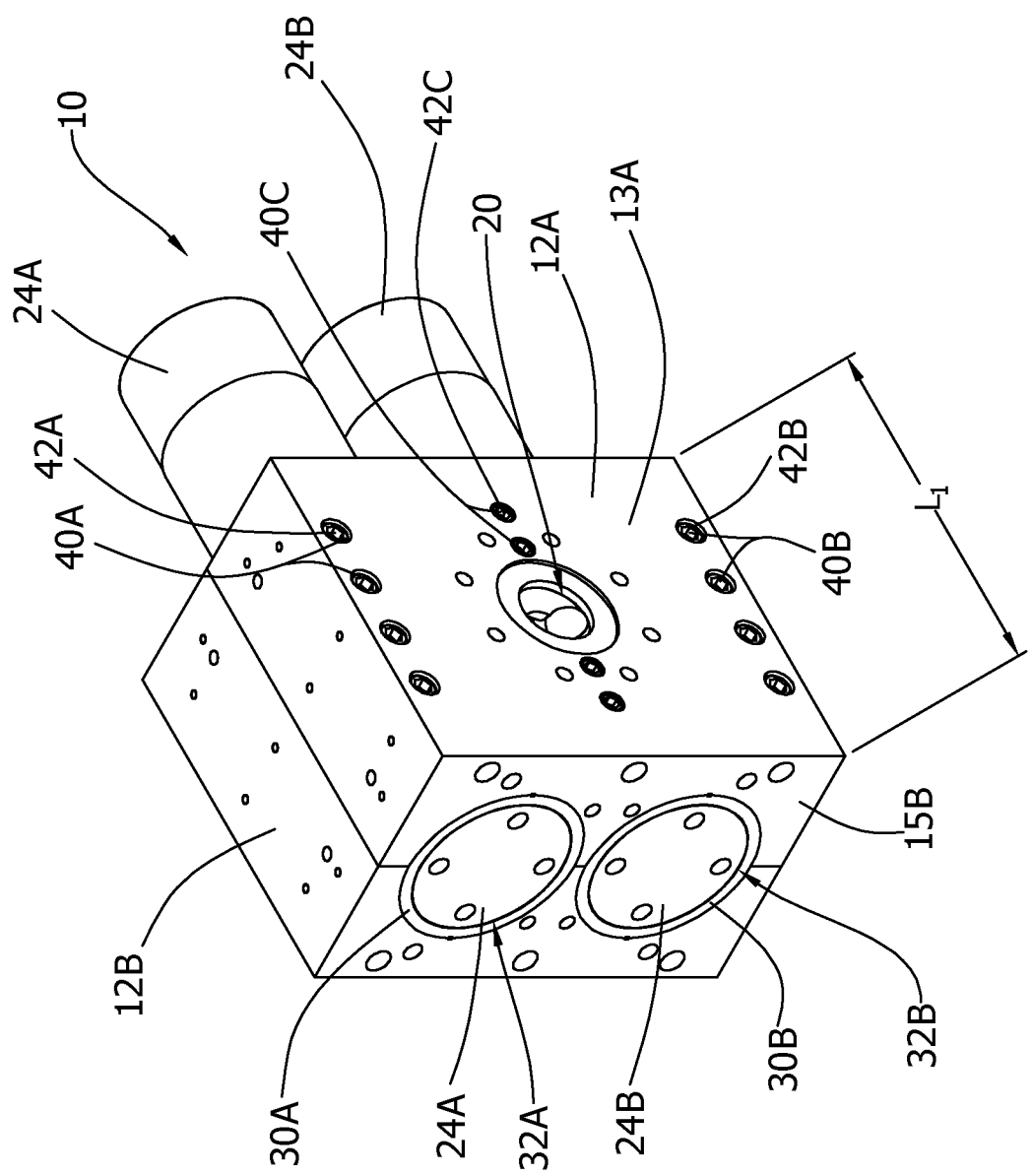
FIG. 1 illustrates a perspective view of an embodiment of a modular continuous screen changer according to the present subject matter.
Figure 2A:
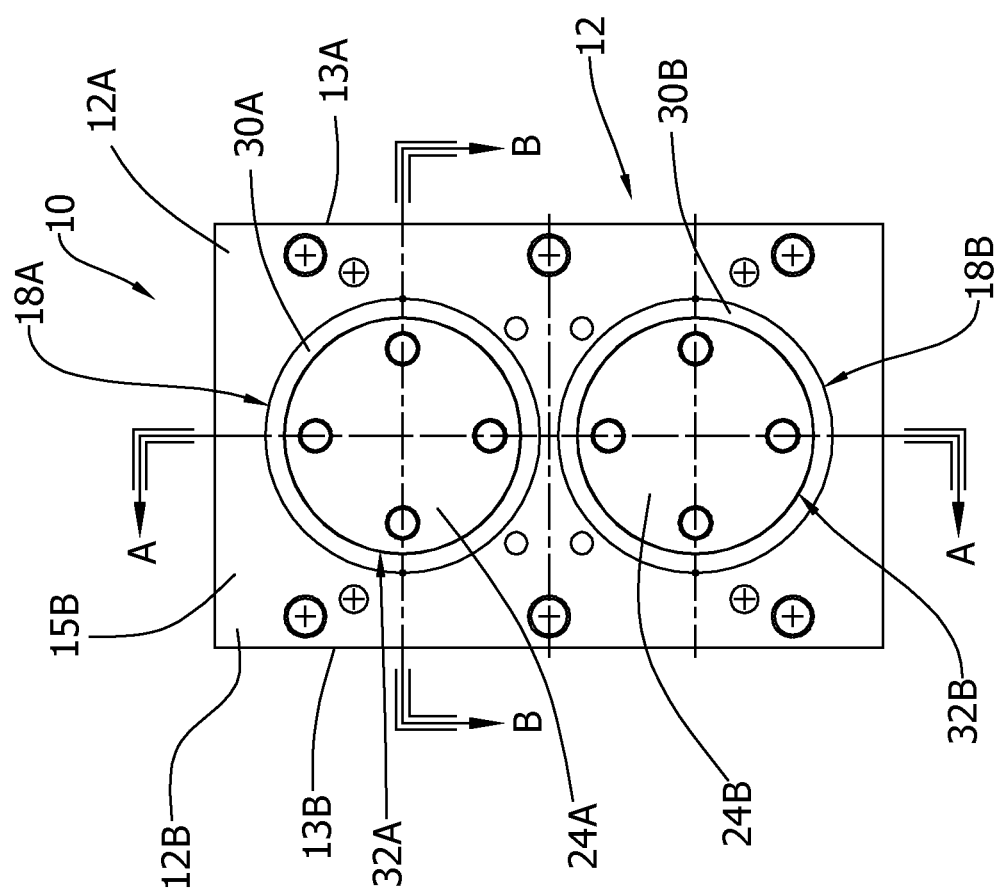
FIG. 2A illustrates a side plan view of a piston side front face of the embodiment of the modular continuous screen changer according to FIG. 1.
Figure 2C:
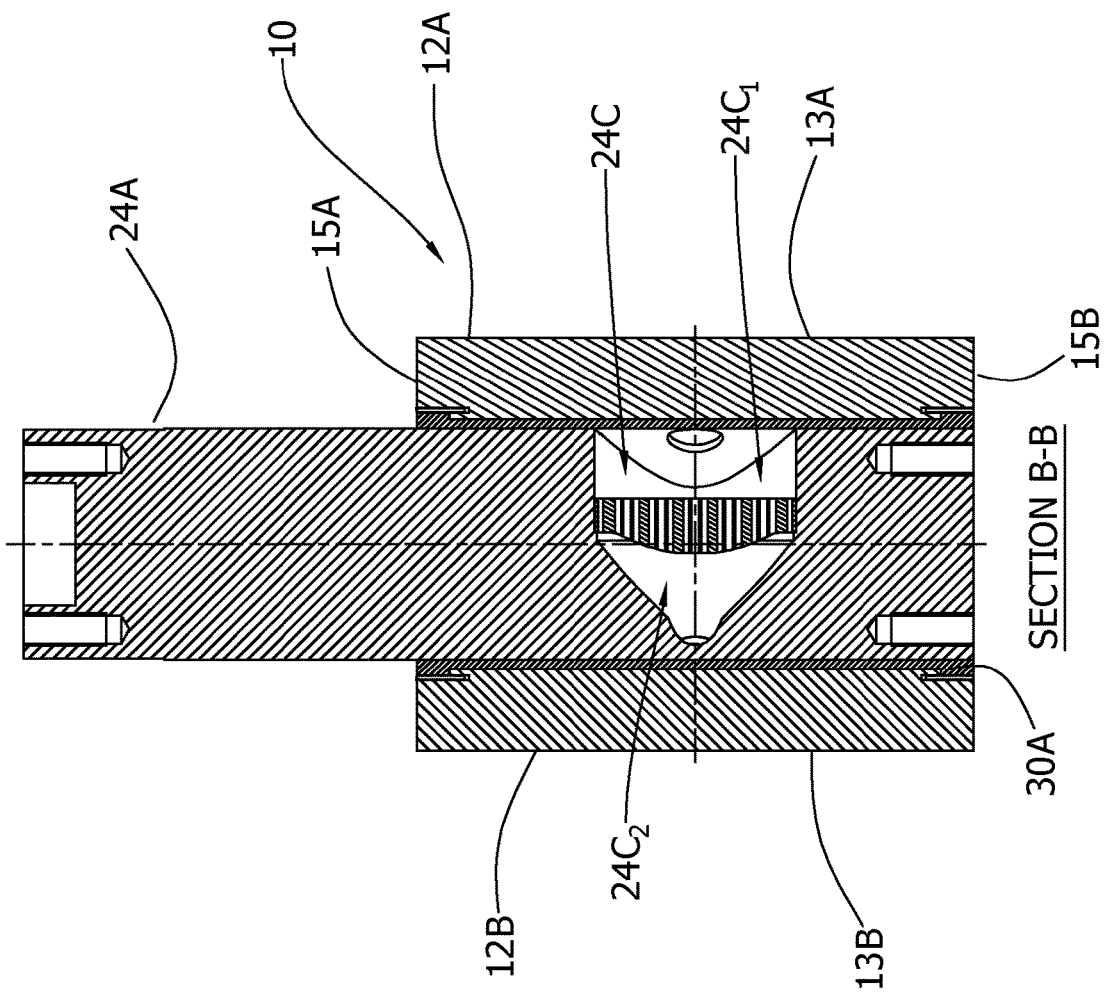
FIG. 2C illustrates a cross-sectional view of the embodiment of the modular continuous screen changer according to FIG. 1 taken along the lines B-B in FIG. 2A.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer section from another feature, element, component, region, layer or section. Thus, a first feature element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer er feature between the layers, unless expressly stated to the contrary. Thus, these terms are simply describing the relative position of the layers to each other and do not necessarily mean on top of since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 140.6. Further, a limit of up to about 7 also includes a limit of up to about 5, up to 3, and up to about 4.5, as well as ranges within the limit, such from about 1 to about 5, and from about 3.2 to about 6.5.

As used herein, the term "half bore" means a channel having an opening on one side of the channel in an item that can be aligned with a channel having an opening on one side of the channel in a second item so that when the openings in the channels are aligned, the two channels within the respective items form a full bore when the items are pressed against each other. In particular within the present disclosure, the term "half bore" is a channel having an opening on one side of the channel in a first body half of a modular fluid processing apparatus that can be aligned with another half bore, i.e., a channel having an opening on one side of the channel in a second body half of the modular fluid processing apparatus so that when the openings in the channels are aligned, the two channels within the respective body halves form, a full bore when the body halves are held together to form a housing of the modular fluid processing apparatus. The channels that form the half bores in the body halves can be the same or differently shapes depending on the full bore being formed.

As used herein, the phrase "line to line fit" means a fit having limits of size so prescribed that surface contact or clearance may result when mating parts as assembled. For example, outside measurements of a first item, or part, that is to fit within a portion of a second item, or part, can be the same or substantially the same as the inside measurements of the portion of the second item in which the first item is to fit with machining tolerances providing some expected variances between such outside and inside measurements in practice.

As used herein, the phrase "interference fit" means a fit between two parts in which the external dimension of one part slightly exceeds the internal dimension of the part into which it is to fit. An interference fit can create a surface to surface contact fit between two parts that creates such friction that makes separation of the two parts difficult.

As used herein, the phrase "compression fit" means a fit between two items, or parts, that is created by expansion or contraction of one item, or part, relative to the other item, or part, to create an interference fit between the two items, or parts. Depending on the nature of the expansion or contraction and the items or parts, the compression fit can be a temporary interference fit or can be a more permanent interference fit.

As used herein, the phrase "pre-machining heat treatment" and related variations mean the heat treating of a piece of metal before the piece of metal is machined into a specific item, or part, such as a component of a modular fluid processing apparatus as disclosed herein.

As used herein, the phrase "post-machining heat treatment" and related variations mean the heat treating of an item, or part, such as a component of a modular fluid processing apparatus as disclosed herein, after the specific item or part is machined from a piece of metal. It is noted that some metal items or parts, such as a component of a modular fluid processing apparatus as disclosed herein, can be pre-machining heat treated and post-machining heat treated.

Modular fluid processing apparatuses are disclosed herein used in the filtering and extrusion of fluids. The modular fluid processing apparatuses can include but are not limited to screen changers and diverter valves, used in the filtering and extrusion of fluids, including, but not limited to molten polymer. The modular fluid processing apparatuses can comprise changeable modular components that permit easier cleaning and servicing of the modular fluid processing apparatuses and allow for replacement of modular components within the modular fluid processing apparatuses.

For example, apparatuses such as modular screen changers and modular components of modular screen changers such as screen changer housing body halves and pathway bore sleeves that facilitate the processing of a fluid, particularly a molten polymer are described herein. As Shown in FIGS. 1-9, an embodiment of a filtration apparatus, in the form of a modular continuous screen changer, generally designated modular continuous screen changer, generally designated 10, is provided for use in fluid processing systems. The fluid processing systems can include, but is not limited to polymer processing systems, fluid foodstuff processing systems, viscous liquid processing systems, or the like. The modular continuous screen changer 10 has filter screens therein through which the fluid being processed flows to capture and remove contaminates from the fluid to purify the fluid being processed for its later intended use. Normally, these fluid processing systems operate at high temperatures to maintain the fluids fluidity and to lower its viscosity to facilitate processing of the fluid.

Figure 4:
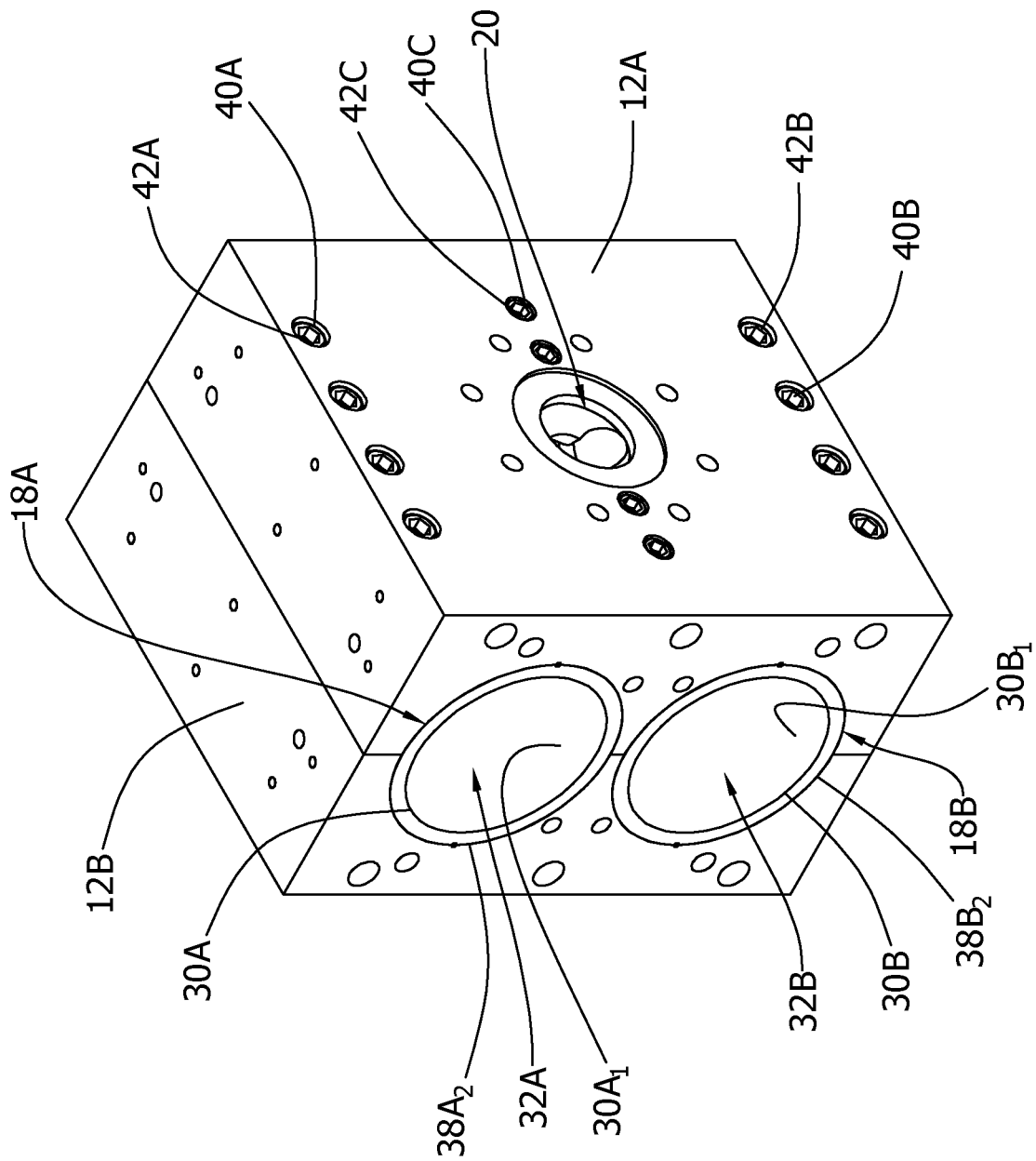
FIG. 4 illustrates a perspective view of an embodiment of a screen changer without the pistons therein that includes embodiments of body halves that form the screen changer housing and sleeves that form the piston bores in which the pistons of the modular continuous screen changer reside and move during operation of the modular continuous screen changer according to the present subject matter.
Figure 5A:
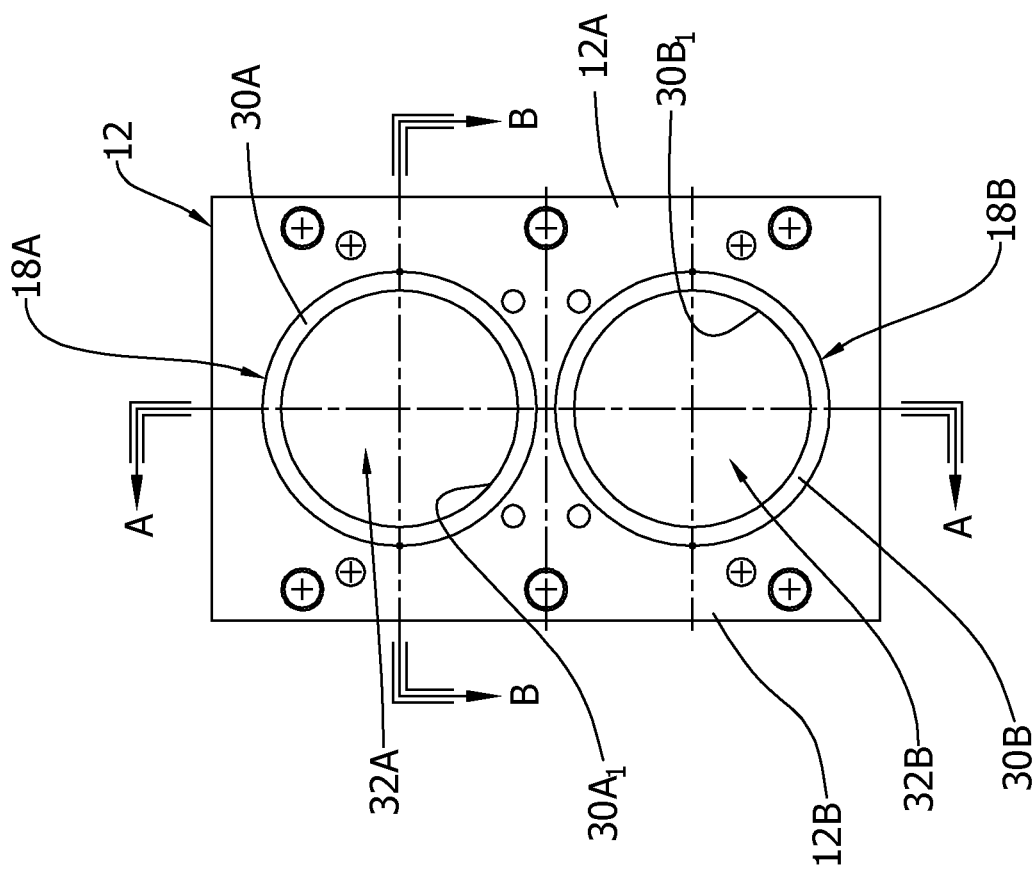
FIG. 5A illustrates a side plan view of a piston side front face of the embodiment of the modular continuous screen changer according to FIG. 4.
Figure 5B:
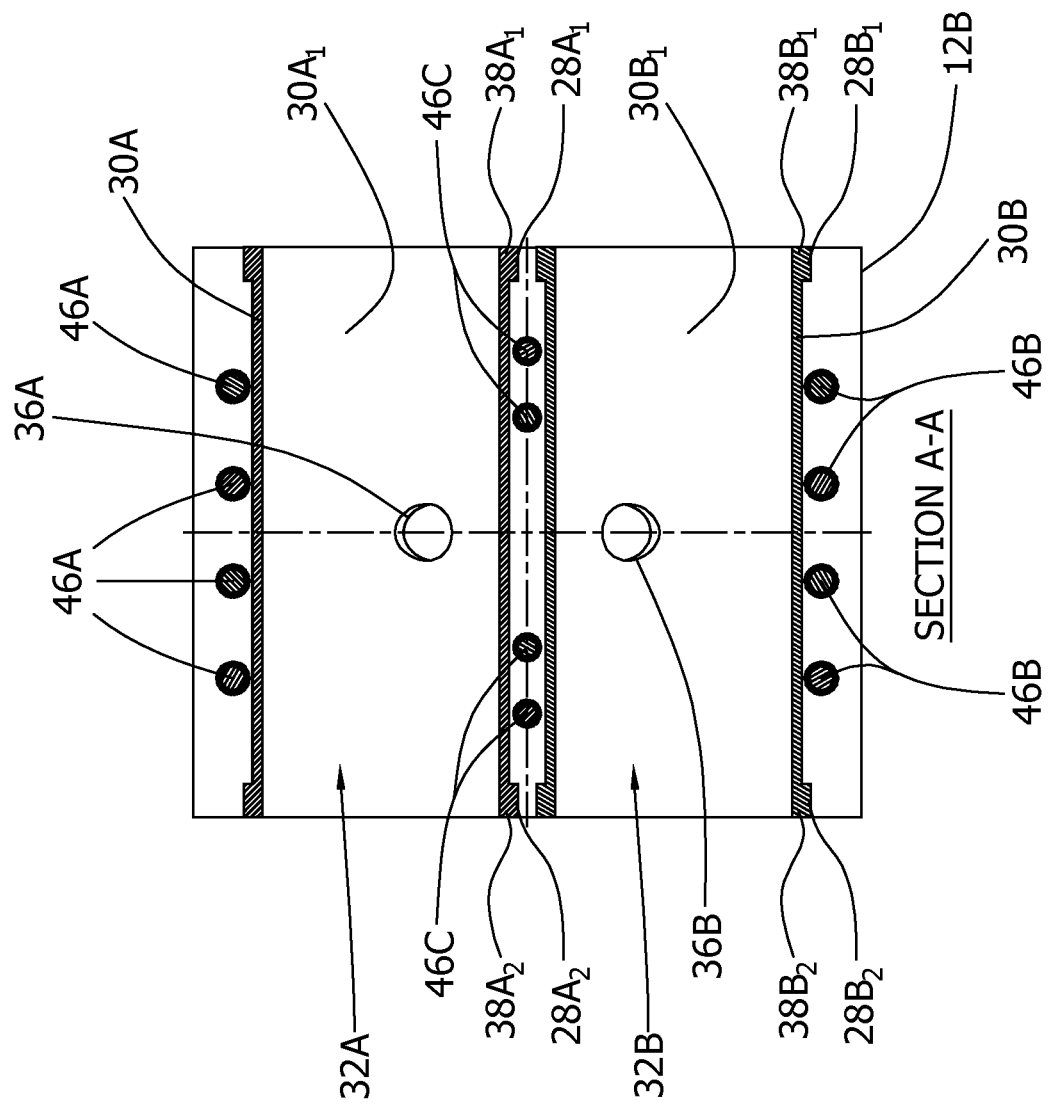
FIG. 5B illustrates a cross-sectional view of the embodiment of the modular continuous screen changer according to FIG. 4 taken along the lines A-A in FIG. 5A.
Figure 5C:
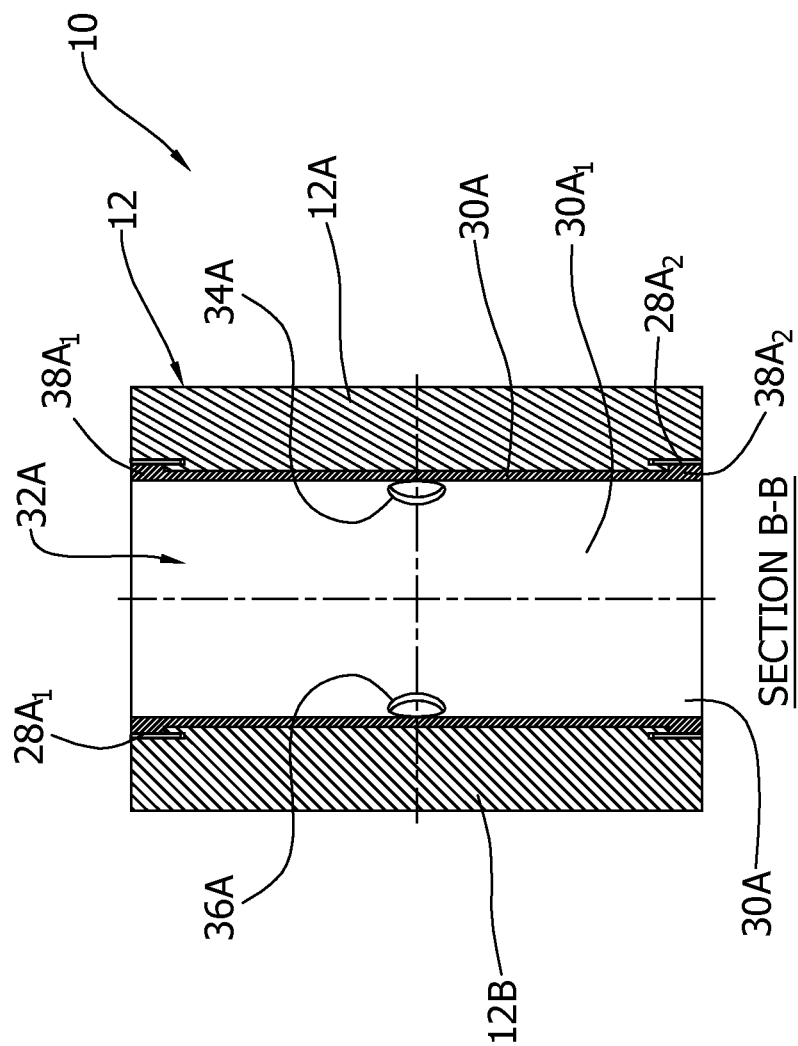
FIG. 5C illustrates a cross-sectional view of the embodiment of the modular continuous screen changer according to FIG. 4 taken along the lines B-B in FIG. 5A.
Figure 6A:
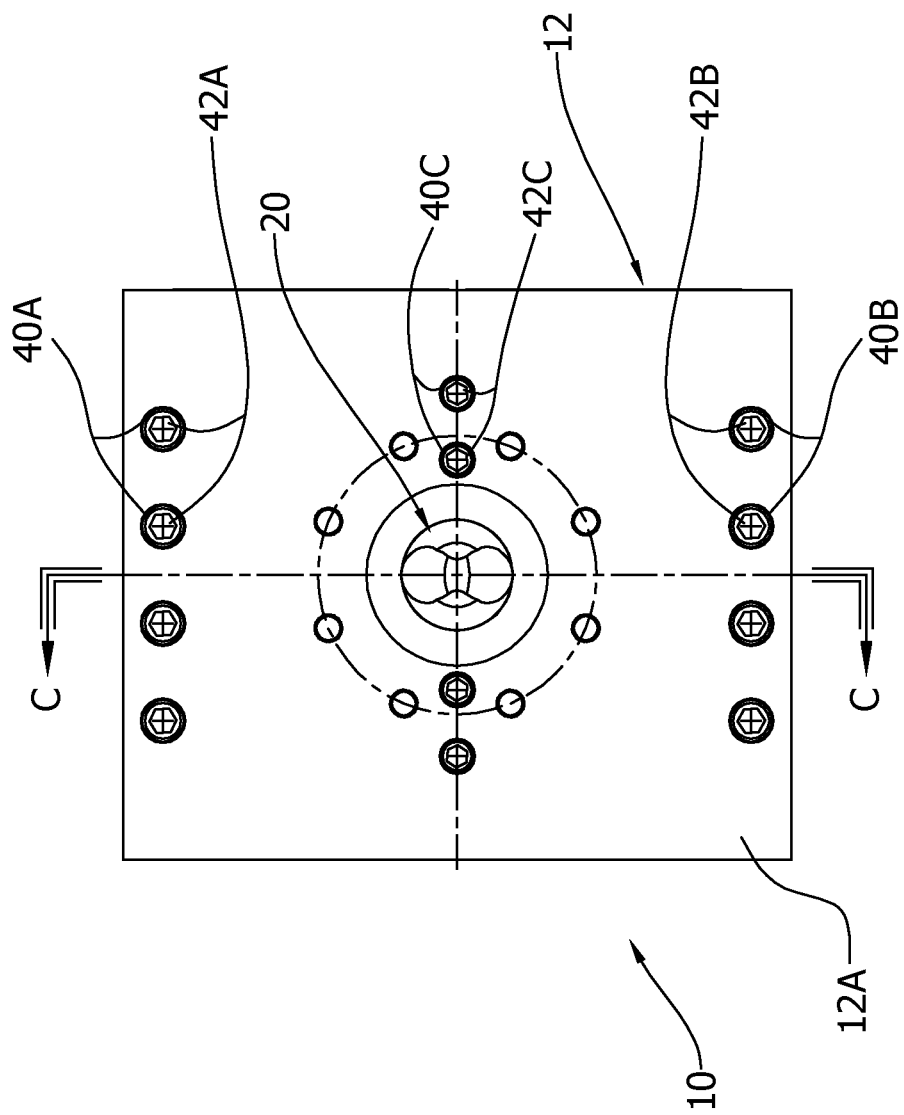
FIG. 6A illustrates a side plan view of a fluid flow side front face of the embodiment of the modular continuous screen changer according to FIG. 4.
Figure 6B:
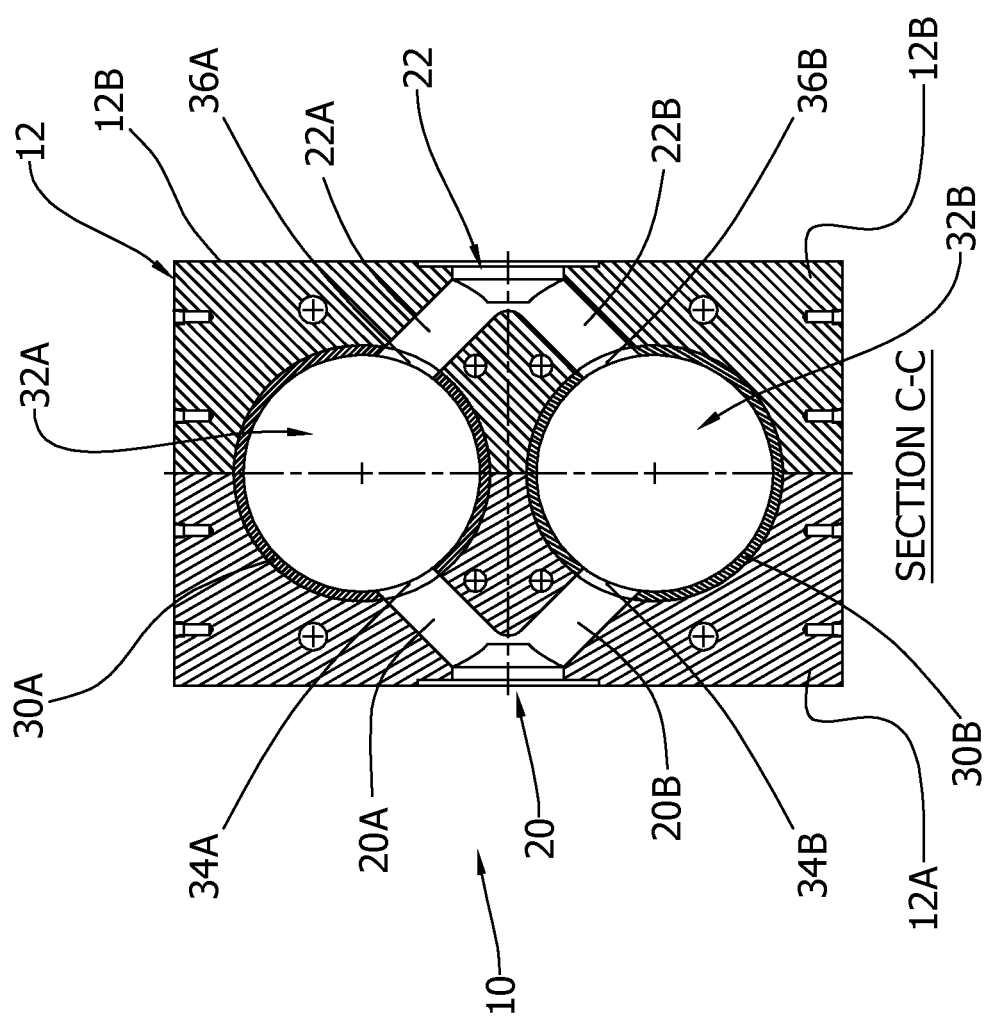
FIG. 6B illustrate s a cross-sectional view of the embodiment of the screen changer housing according to FIG. 4 taken along the lines C-C, in FIG. 6A.
Figure 9:
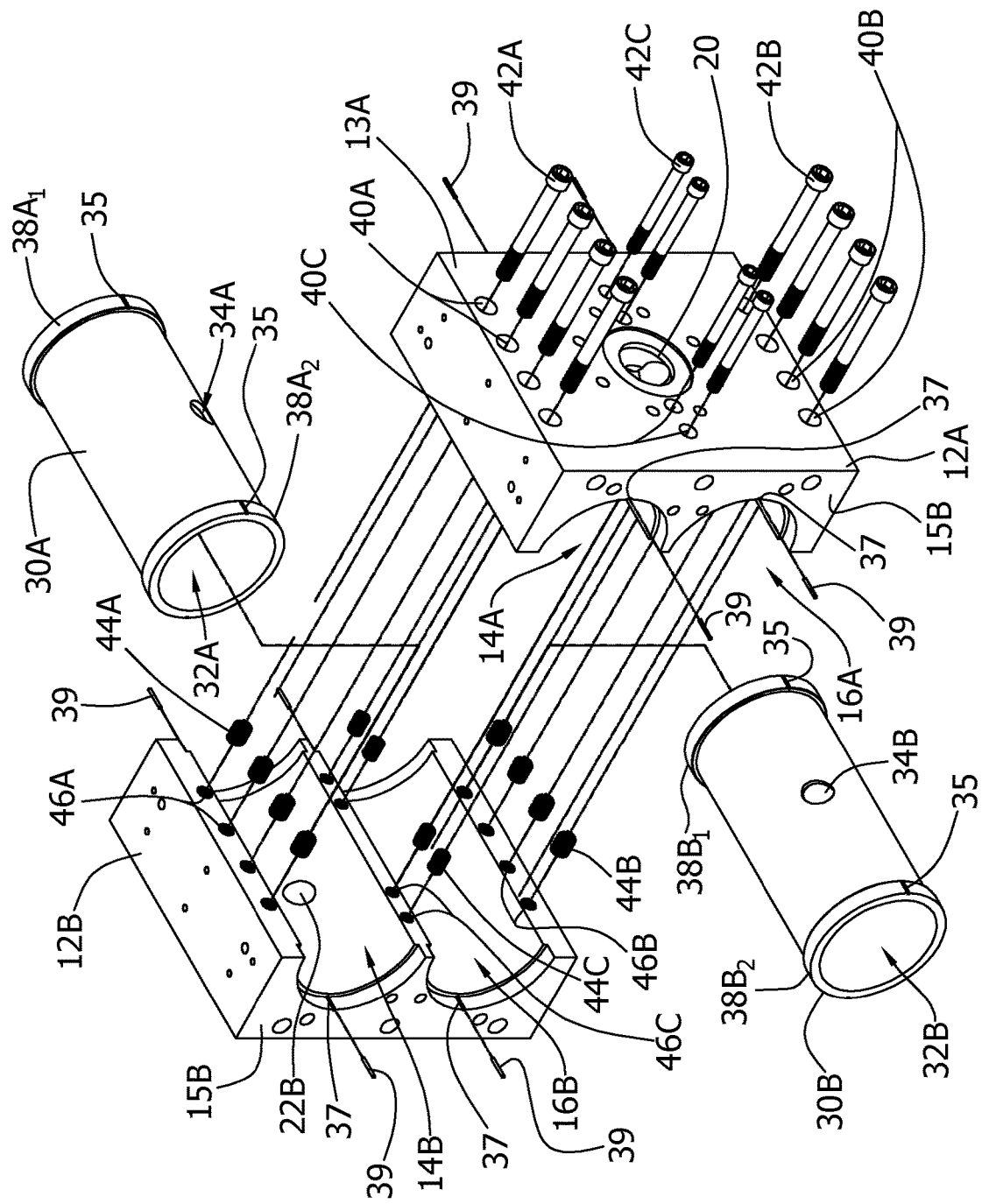
FIG. 9 illustrates an explode view of an embodiment of a modular continuous screen changer according to the present subject matter.

The modular continuous screen changer 10 can comprise a screen changer housing 12 that can include a first body half 12A and a second body half 12B that can be secured together for filtration operations. Referring to FIGS. 1, 8 and 9, the first body half 12A can have a first open half bore 14A that extends along a length $L_1$ of the first body half 12A and the second body half 12B can have a first open half bore 14B that extends along a length $L_2$ of the second body half 12B. Additionally, the first body half 12A can have a second open half bore 16A that extends along the length $L_1$ of the first body half 12A proximate to the first open half bore 14A in the first body half 12A and the second body half 12B can have a second open half bore 16B that extends along the length $L_2$ of the second body half 12B proximate to the first open half bore 14B in the second body half 12B. When the first and second body halves 12A, 12B are secured together to form the screen changer housing 12, the first open half bore 14A in the first body half 12A can be aligned with the first open half bore 14B in the second body half 12B to form a full first sleeve-receiving bore 18A as seen in FIGS. 1 and 4. Similarly, the second open half bore 16A in the first body half 12A can be aligned with the second open half bore 16B in the second body half 12B to form a full second sleeve-receiving bore 18B for receiving a sleeve.

In some embodiments of modular fluid processing apparatuses depending on the desired shape of the full bores 13A, 18B, the half bores 14A, 14B, 16A, 16B can comprise different shapes as needed or required. For example, half bores 14A, 14B and the half bores 16A, 16B can have the same or different shapes depending on the design of the modular fluid processing apparatus. In some embodiments of a modular fluid processing apparatus, the full bores 18A, 18B can have one of a variety of cross-sectional shapes. For example, the full bores 18A, 18B can have a circular cross-sectional shape, a rectangular cross-section shape, a square cross-sectional shape, an elliptical cross-sectional shape, a non-symmetrical cross-sectional shape, or the like. The half bores and full bores may be differently shaped depending on the shape of the sleeves and/or pistons used in the specifically designed modular fluid processing apparatus. As shown in FIGS. 1-9, the half bores 14A, 14B, 16A, 18B are half-circular bores that form full-circular first sleeve-receiving bores 18A, 18B and may be referred to as such going forward.

As shown in the embodiment of FIGS. 1, 3A, 3B, 4, 6A, and 6B, the screen changer housing can comprise a main supply channel 20 configured in the first body half 12A and a main discharge channel 22 configured in the second body half 12B. Fluids being processed in the fluid processing system, such as a polymer in liquid form, can pass through the main supply channel 20 in the first body half 12A of the modular continuous screen changer 10 to be filtered before passing through the main discharge channel 22 in the second body half 12B of the modular continuous screen changer 10 for further processing downstream of the modular continuous screen changer 10 within the fluid processing system.

Figure 3A:
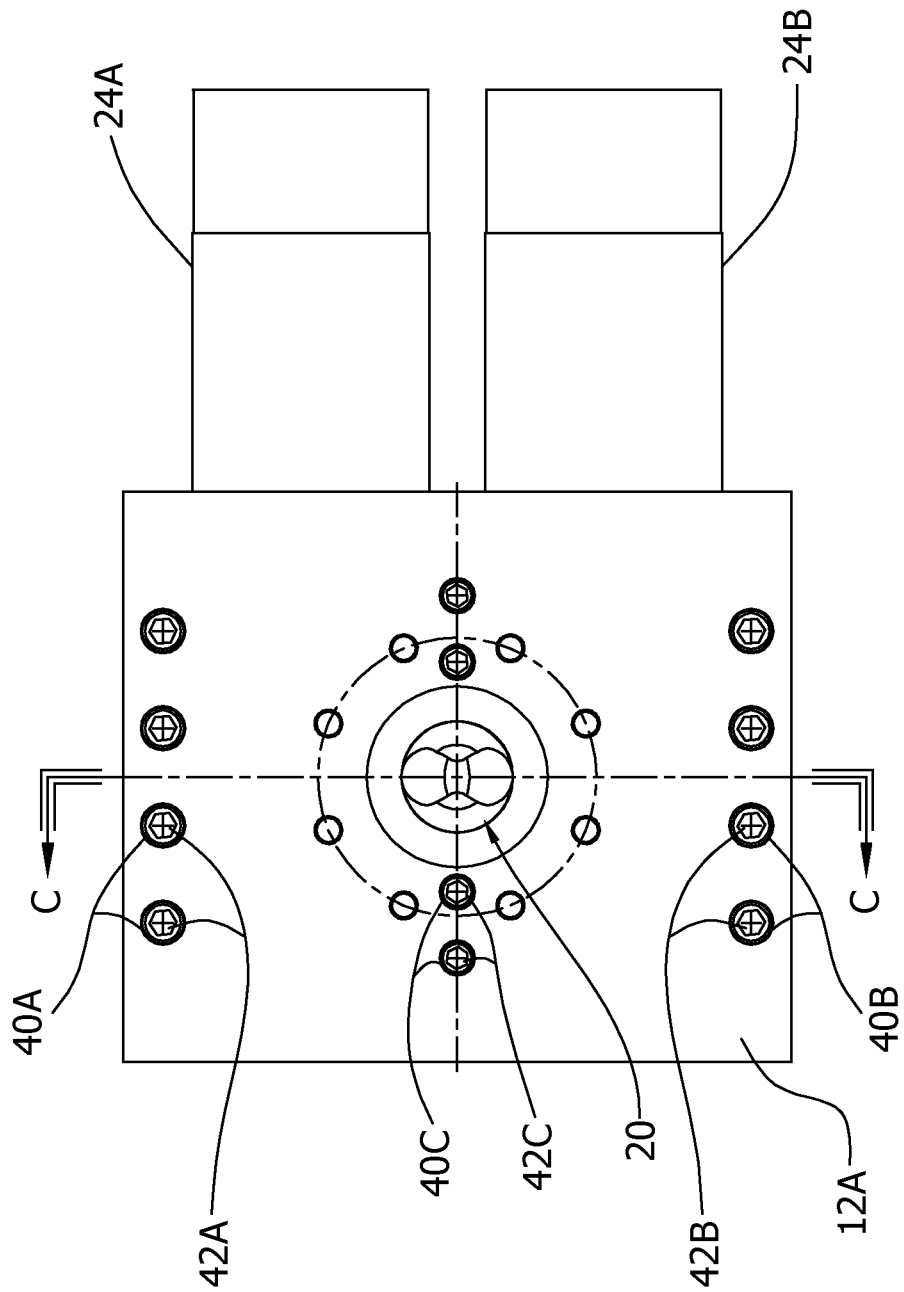
FIG. 3A illustrates a side plan view of a fluid flow side front face of the embodiment of the modular continuous screen changer according to FIG. 1.
Figure 3B:
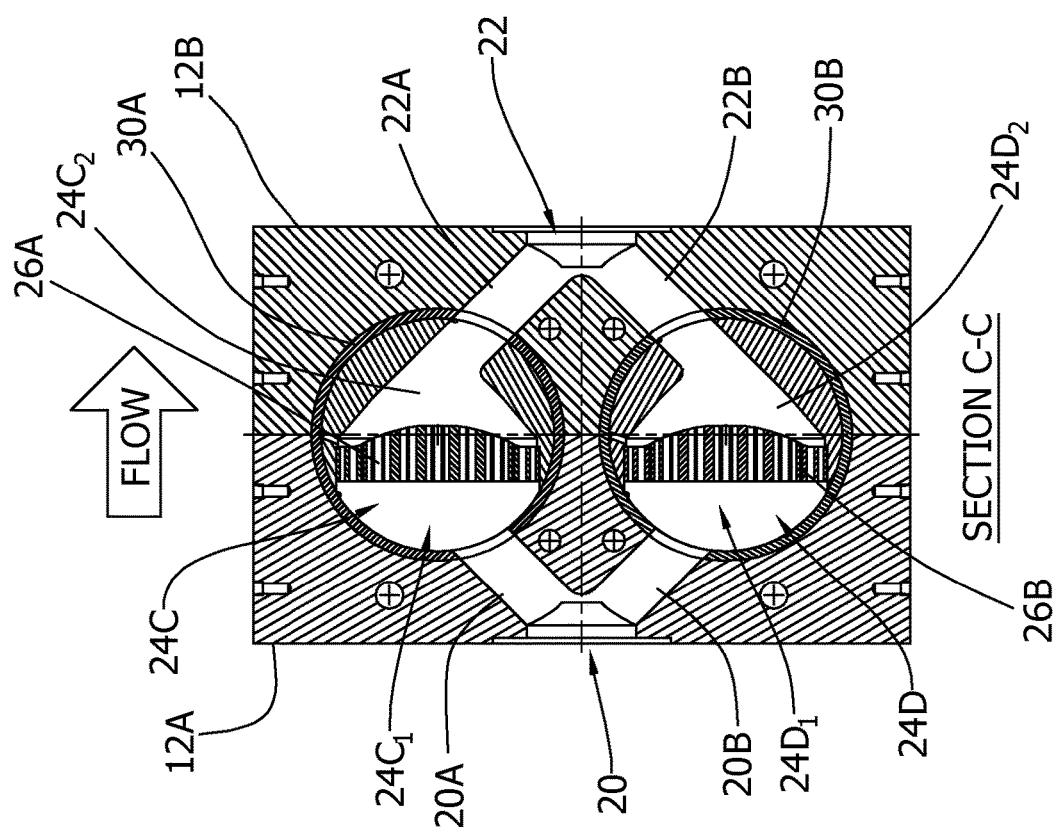
FIG. 3B illustrates a cross-sectional view of the embodiment of the modular continuous screen changer according to FIG. 1 taken along the lines C-C in FIG. 3A.

In some embodiments, the main supply channel 20 and the main discharge channel 22 can each be divided into sub-channels 20A, 20B, 22A, 22B as shown in FIGS. 3B and 8E. For example in some such embodiments, a portion of the main supply channel 20 can be divided into a first supply sub-channel 20A that can extend into the first open half-circular bore 14A of the first body half 12A and a second supply sub-channel 20B that can extend into the second open half-circular bore 16B of the first body half 12A. Similarly, portion of the main discharge channel 22 can be divided into a first discharge sub-channel 22A that can extend into the first open half-circular bore 14B of the second body half 12B and a second discharge sub-channel 22B that can extend into the second open half-circular bore 16B of the second body half 12B.

The module continuous screen changer 10 can else comprise one or more screen-bearing pistons. For example, as shown in the figures, two screen-bearing pistons 24A and 24B can be provided in the modular continuous screen changer 10. Each screen-bearing piston 24A, 24B can comprise one or more filter screen cavities for supporting filter screens, or screen packs. For example, screen-bearing pistons 24A, 24B can comprise filter screen cavities 24C and 24D. Each filter screen cavity 24C and 24D can be configured to receive a filter screen, or screen pack, 26A, 26B as well as a breaker plate and a screen retention plate (not identified in the Figures). The filter screen cavities 24C and 24D in the respective sore bearing piston 24A, 24B can each comprise a screen pocket $24C_1$ and $24D_1$ on the supply channel side for receiving the screen packs 26A, 26B and that can be aligned with the respective supply sub-channels 20A, 20B for supplying fluid to be filtered. The filter screen cavities 24C and 24D in the respective screen-bearing pistons 24A, 24B can also comprise a discharge channel $24C_2$ and $24D_2$ that can be aligned with the respective discharge sub-channels 22A, 22B for discharging the filtered fluid downstream in a fluid processing system.

In some embodiments, the main supply channel 20 can be divided into a multiple supply sub-channels and the main discharge channel 22 can be divided into a multiple discharge sub-channels for each screen-bearing piston 24A, 24B. For example, in some embodiments, a portion of the main supply channel can be divided into two or more first supply sub-channels that extends into the first open half bore of the first body half and two or more second supply sub-channels that extends into the second open half bore of the first body half. Similarly, a portion of the main discharge channel can be divided into two or more first discharge sub-channels that extends into the first open half bore of the second body half and two or more second discharge sub-channels that extends into the second open half bore of the second body half. In such embodiments, the first sleeve can have two or more supply apertures that are alignable with the first supply sub-channels in the first body half of the screen changer housing and two or more discharge apertures that are alignable with the first discharge sub-channels in the second body half of the screen changer housing when the first sleeve is properly aligned within the first sleeving-receiving bore. Similarly, the second sleeve can have two or more supply apertures that are alignable with the second supply sub-channels in the first body half of the screen changer housing and two or more discharge apertures that are alignable with the second discharge sub-channels in the second body half of the screen changer housing when the second sleeve is properly aligned within the second sleeving-receiving bore.

To hold the pistons 24A, 24B within the screen changer housing 12 and provide a proper operational fit that allows movement of the pistons 24A, 24B the modular continuous screen changer 10 while minimizing leaks of the fluid being processed, the modular continuous screen changer 10 can have sleeves 30A, 30B that can reside within the respective sleeve-receiving bores 18A, 18B. The tolerances of the fit between the pistons and the sleeves can vary depending on the fluid or fluids to be processed. For example, modular fluid processing apparatuses designed to process higher viscous fluids can have higher tolerances between the pistons and the sleeves meaning the operational fit can be less exact and still reduce leaking of the fluids being processed. As another example, modular fluid processing apparatuses designed to process lower viscous fluids can have lower tolerances between the pistons and the sleeves meaning the operational fit is more exact providing a tighter clearance to reduce leaking of the fluids being processed.

For example, the modular continuous screen changer 10 can have a first sleeve 30A that can be secured between the first body half 12A and the second body half 12B within the first sleeve-receiving bore 18A to form a first piston pathway 32A within the screen changer housing 12 for receiving the first piston 24A. Additionally, the modular screen changer 10 can thus comprise a second sleeve 30B that can be secured between the first body half 12A and the second body half 12B within the second sleeve-receiving bore 18B to form a second piston pathway 32B within the screen changer housing 12 for receiving a second piston 24B. The first and second sleeves 30A, 30B can comprise a stronger and more heat resistant metal that can more closely mirror the metallurgy of the pistons 24A, 24B as compared to the metal used to form the first and second body halves 12A, 12B of the screen changer housing 12. In this manner, a cheaper metal can be used for the first and second body halves 12A, 12B of the screen changer housing 12 as compared to the first and second sleeves 30A, 30B while still providing a modular continuous screen changer 10 that produces quality filtered fluids, so that the modular continuous screen changer 10 can be cheaper to make and cheaper and easier to clean and repair. For example, in some embodiments, first and second body halves 12A, 12B of the screen changer housing 12 can comprise a metal that is a lower grade metal than the metal used to form the first and second sleeves 30A, 30B. For example, first and second body halves 12A, 12B can comprise a metal that is not heat-treated post-machining.

In some embodiments, the metal of the first and second body halves 12A, 12B of the screen changer housing 12 can have a different thermal expansion rate than the thermal expansion rate of the first and second sleeves 30A, 30B. For example, in some embodiments, during operation of the processing system in which the modular continuous screen changer 10 is employed, the first and second sleeves 30A, 30B can compress against the first and second body halves 12A, 12B of the screen changer housing 12 while the first and second sleeves 30A, 30B can maintain a proper operational fit with pistons 24A, 24B. In some embodiments, the first and second sleeves 30A, 30B can comprise a metal that is heat-treated post machining to withstand the heat and pressures of a polymer processing line. Thus, for example, the first and second sleeves 30A, 30B can comprise a first metal while the first and second body halves 12A, 12B can comprise a second metal with the first metal having a different thermal expansion rate than the second metal.

In some embodiments, the thermal expansion rate of the metal of the first and second sleeves 30A, 30B is the same as the thermal expansion rate of the metal of pistons 24A, 24B of the modular continuous screen changer 10 that are insertable into the first and second sleeves 30A, 30B. As the first and second sleeves 30A, 30B and the pistons 24A, 24B expand keeping a proper operational fit between the first and second sleeves 30A, 30B and the pistons 24A, 24B that allows the pistons 24A, 24B to move, i.e. slide, within the first and second sleeves 30A, 30B while maintaining an acceptable level of leakage of the fluid being processed to facilitate lubrication of the pistons 24A, 24B a compression fit can be created between the first and second body halves 12A, 12B and the first and second sleeves 30A, 30B. The compression fit can create an interference fit between the first and second body halves 12A, 12B and the first and second sleeves 30A, 30B that can be maintained while these components of the modular fluid processing apparatus, i.e., the screen changer 10 are heated to the operating temperatures of the screen changer 10. Thus, in some embodiments, this interference fit can be temporary in nature.

In some embodiments, the metal of the first and second sleeves 30A, 30B can comprise at least one of a stainless steel or a post-machining heat-treated steel or steel alloy, while the metal of the first and second body halves 12A, 12B can comprise a post-machining untreated steel or steel alloy. For example, in some embodiments, the metal of the first and second sleeves 30A, 30B can comprise a 4140 steel alloy and the metal of the first and second body halves 12A, 12B can comprise a 36A mild steel.

The first and second sleeves 30A, 30B can extend the length $L_1$, $L_2$ of the first and second body halves 12A, 12B such that the first and second sleeves 30A, 30B can extend from a piston entry face 15A of the screen changer housing 12 to an opposite side piston flush face 15B of the screen changer housing 12 where the end of the pistons 24A, 24B can sit about flush with this face of the screen changer housing 12 when both pistons 24A, 24B are in position for filtering during operation. The piston entry face 15A and the piston flush face 15B can be about parallel to each other and perpendicular to a supply face 13A of the screen changer housing 12 in which the supply channel 20 resides and a supply face 13B of the screen changer housing 12 in which the supply channel 22 resides.

To accommodate the supply and discharge channels 20, 22 and sub-channels 20A, 22A the first sleeve 30A can comprise a supply aperture 34A that can be aligned with the first supply sub-channel 20A in the first body half 12A of the screen changer housing 12 and a discharge aperture 36A that can be aligned with the first discharge sub-channel 22A in the second body half 12B of the screen changer housing 12 when the first sleeve 30A is properly aligned within the full-circular first sleeve-receiving bore 18A. Similarly, the second sleeve 30B can comprise a supply aperture 34B that can be aligned with the second supply sub-channel 20B in the first body half 12A of the screen changer housing 12 and a discharge aperture 36B that can be aligned with the first discharge sub-channel 22B in the second body half 12B of the screen changer housing 12 when the second sleeve 30B is property aligned within the full-circular second sleeve-receiving bore 18B.

In some such embodiments, the first sleeve 30A can comprise a collar $38A_1$ that extends around a first end of the first sleeve 30A that can reside at the piston flush face 15B of the screen changer housing 12 and a collar $38A_2$ that extends around a second opposing end of the first sleeve 30A that can reside at the piston flush face 15B of the screen changer housing 12 when the first sleeve 30A is installed. Similarly, the second sleeve 30B can comprise a collar $38B_1$ that extends around a first end of the second sleeve 30B that can reside at the piston entry face 15A of the screen changer housing 12 and a collar $38B_2$ that extends around a second opposing end of the second sleeve 30B that can reside at the piston flush face 15B of the screen changer housing 12 when the second sleeve 30B is installed.

When installed in the screen changer housing 12, the collars $38A_1$, $38A_2$, $38B_1$, $38B_2$ of the first and second sleeves 30A, 30B can reside in indentions $28A_1$, $28A_2$, $28B_1$, $28B_2$ around the respective full-circular first sleeve-receiving bore 18A and second sleeve-receiving bore 18B of the screen changer housing 12. In such embodiments, for examples, the first body half 12A can include indentions $28A_1$, $28B_1$ that are wider than the first and second open half-circular bores 14A, 16A of the first body half 12A around first ends of the first and second open half-circular bores 14A, 16A at the piston entry face 15A of the screen changer housing 12 and indentions $28A_2$, $28B_2$ that are wider than the first and second open half-circular bores 14A, 16A of the first body half 12A around second ends of the first and second open half-circular bores 14A, 16A at the piston flush face 15B of the screen changer housing 12. Similarly, the second body half 12B can include indentions $28A_1$, $28B_1$ that are wider than the first and second open half-circular bores 14B, 16B of the second body half 12B around first ends of the first and second open half-circular bores 14B, 16B at the piston entry face 15A of the screen changer housing 12 and indentions $28A_2$, $28B_2$ that are wider than the first and second open half-circular bores 14B, 16B of the second body half 12B around a second end of the first and second open half-circular bores 14B, 16B at the piston flush face 15B of the screen changer housing 12. These indentions $28A_1$, $28A_2$, $28B_1$, $28B_2$ in the first and second body halves 12A, 12B at the piston entry face 15A and tire piston flush face 15B of the screen changer housing 12 can be configured to receive the collars $38A_1$, $38A_2$, $38B_1$, $38B_2$ of the first and second sleeves 30A, 30B when the first and second sleeves 30A, 30B are placed between the first body half 12A and the second body half 12B when the first and second body halves 12A, 12B are secured together.

In some particular embodiments, to secure proper alignment of the first and second sleeves 30A, 30B within the screen changer housing 12 when the first and second body halves 12A, 12B are secured together, one or more of the collars $38A_1$, $38A_2$, $38B_1$, $38B_2$ of each of the first and second sleeves 30A, 30B can have at least one groove 35 that can be aligned with a groove 37 in one of the indentions $28A_1$, $28A_2$, $28B_1$, $28B_2$ in either the first or second body halves 12A, 12B to form an aperture for receiving a locking pin 39 to ensure proper alignment of each respective first and second sleeves 30A, 30B within the screen changer housing 12. When inserted into the aperture formed by the grooves 35, 37, the locking pin 39 resides between the respective indention $28A_1$, $28A_2$, $28B_1$, $28B_2$ in body half 12A, 12B in which the groove 37 is formed and the respective collar $38A_1$, $38A_2$, $38B_1$, $38B_2$ of the sleeve 30A, 30B in which the groove 35 is formed with a portion of the locking pin 39 residing in the groove 37 and a portion of the locking pin 39 residing in the groove 35.

In some embodiments, the first and second sleeves 30A, 30B can be configured to expand when heated within the screen changer housing 12 to create a compression fit within the first and second sleeve-receiving bores 18A, 18B respectively, formed by the first and second body halves 12A, 12B. Further, the first and second sleeves 30A, 30B can comprise grooves within an interior wall $30A_1$, $30B_1$ for receiving seals for a low-viscosity fluid or polymer as explained further below.

The first body half 12A can comprise first connection apertures 40A, 40B, 40C and the second body half 12B comprise second connection apertures 46A, 46B, 46C. In some embodiments, the first connection apertures 40A, 40B, 40C can extend through the first body half 12A while the second connection apertures 46A, 46B, 46C can extend into but not through the second body half 12B. The first and second connection apertures 40A, 40B, 40C, 46A, 46B, 46C of the respective body halves 12A, 12B can be aligned to receive bolts 42A, 42B, 42C for securing the first and second body halves together to form a tight metal to metal fit between the body halves 12A, 12B and the first and second sleeves 30A, 30B. For example, the first and second connection apertures 40A, 40B, 40C, 46A, 46B, 46C can be aligned to receive bolts 42A, 42B, 42C for securing the first and second body halves 12A, 12B together in a line to line fit between the body halves 12A, 12B and the first and second sleeves 30A, 30B.

The first and second connection apertures 40A, 40B, 40C, 46A, 46B, 46C can be positioned at different locations with the first and second body halves 12A, 12B to ensure that first and second body halves 12A, 12B are tightly held together and the first and second sleeves 30A, 30B are tightly held in proper position. For example, the first and second connection apertures 40A, 46A can be positioned along upper sections of the first and second body halves 12A, 12B above the first and second open half-circular bores 14A, 14B, 16A, 16B in the respective first and second body halves 12A, 12B, while the first and second connection apertures 40B, 46B can also be positioned along lower sections below the first and second open half-circular bores 14A, 14B, 16A, 16B in the respective first and second body halves 12A, 12B. Further, to help hold the first and second body halves 12A, 12B together, the first are second connection apertures 40C, 46C can be positioned along middle sections between the first and second open half-circular bores 14A, 14B, 16A, 16B in the respective first d second body halves 12A, 12B.

To secure bolts within the first and second body halves 12A, 12B, threaded inserts 44A, 44B, 44C can be inserted into the connection apertures 46A, 46B, 46C of the second body half. The bolts 42A, 42B, 42C can be inserted through the connection apertures 40A, 40B, 40C in the first body half 12A and configured to engage the threaded inserts 44A, 44B, 44C to create a tight enough compression between the first and second body halves 12A, 12B to withstand 10,000 p.s.i. In some embodiments, the threaded inserts 44A, 44B, 44C carp be helical inserts. In some embodiments, the second connection apertures 46A, 46B, 46C can be threaded to receive and secure the bolts 42A, 42B, 42C.

The bolts 42A, 42B, 42C can have the same or similar thermal expansion rate as the first and second body halves 12A, 12B to help ensure that the first and second body halves 12A, 12B are held tightly against each other and the first and second sleeves 30A, 30B to reduce or prevent any leakage of the polymer being processed through the modular continuous screen changer 10 between the first and second body halves 12A, 12B and the first and second sleeves 30A, 30B. For example, the metallurgy of the bolts 42A, 42B, 42C can be the same or similar to the metallurgy of the first and second body halves 12A, 12B. For instance, in some embodiments, the bolts 42A, 42B, 42C and the first and second body halves 12A, 12B can comprise a pre-machine heat treated steel that is not heat-treated post machining. In some embodiments, the bolts 42A, 42B, 42C and the first and second body halves 12A, 12B can comprise a 36A mild steel.

With the modular continuous screen changers 10 disclosed herein, the cleaning and repair of the screen changer 10 can be accomplished more easily. During cleaning or repair, the bolts 42A, 42B, 42C can be loosened and the first and second body halves 12A, 12B pulled apart so that the first and second sleeves 30A, 30B can be removed as needed. When repair is needed, the sleeves 30A, 30B can be replaced as needed and in some embodiments, the sleeves 30A, 30B can be interchangeable. In this manner, if one of the first and second sleeves 30A, 30B is damaged or clogged, then that sleeve can be replaced by a new sleeve and the modular continuous screen changer 10 can be reassembled. Similarly, the first and second body halves 12A, 12B, while not interchangeable can be replaced as needed if damaged. For example, if one of the first and second body halves 12A, 12B is damaged, the first and second body halves 12A, 12B can be unfastened and the damaged body half can be removed and replaced by a corresponding new body half. With the use of the sleeves 30A, 30B that are precisely made for receiving the screen-bearing pistons 24A, 24B, the machining of the first and second body halves 12A, 12B does not have to be as precise.

Figure 7A:
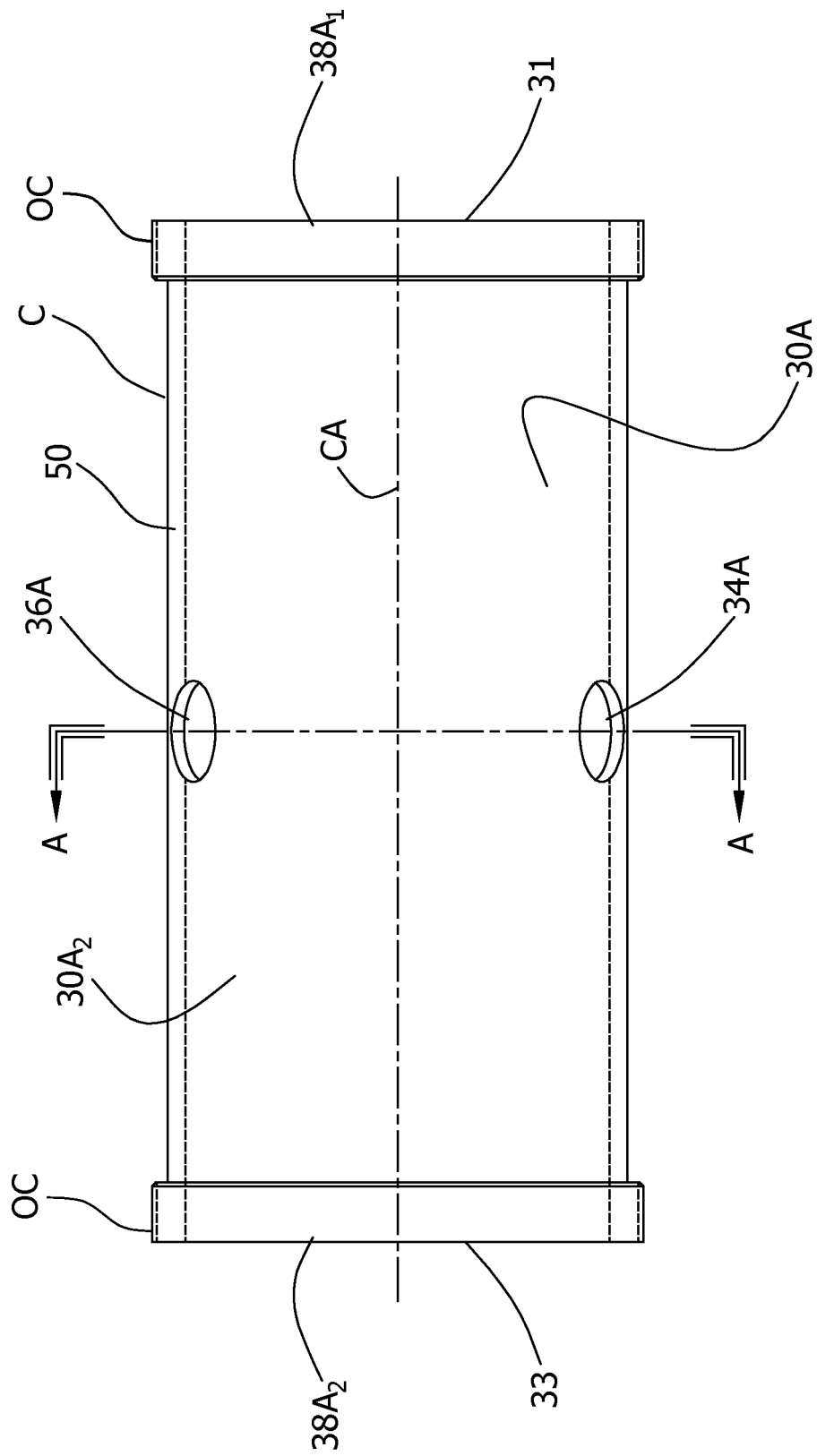
FIG. 7A illustrates a side plan view of an embodiment of a sleeve that can be used in a modular continuous screen changer according to the present subject matter.

Thus, the sleeve is a component that, while being precision made, is replaceable. As shown in FIGS. 7A and 7B, a sleeve 30A can be provided that can be configured to receive a piston, such as a screen-bearing piston, within a modular fluid processing apparatus, such as a modular screen changer, for use in fluid processing systems. The sleeve 30A can comprise a cylindrical body 50 having a first end 31 and a second end 33. The body 50 can have an interior wall $30A_1$ that defines a piston receiving aperture through the body and an exterior wall $30A_2$. The exterior wall or walls $30A_2$ can comprise a shape that fits half bores within first and second body halves of a modular fluid processing apparatus. In some embodiments, the exterior wall $30A_2$ can form an outer circumference C of the cylindrical body 50 that fits half bores within first and second body halves of a modular fluid processing apparatus in which it is to be used. The sleeve 30A can comprise a first collar $38A_1$ extending radially outward from the exterior wall $30A_2$ at the first end 31 of the body 50 and a second collar $38A_2$ extending radially outward from the exterior wall $30A_2$ at the second end 33 of the body 50. One or more supply fluid flow apertures 34A can extend through the exterior wall $30A_2$ of the body 50. Similarly, one or more discharge fluid flow apertures 36A can extend through the exterior wall $30A_2$ of the body 50.

The one or more discharge fluid flow apertures 36A can be aligned with the one or more supply fluid flow apertures 34A. The one or more discharge fluid flow apertures 36A and the one or more supply fluid flow apertures 34A can each have about the same or similar diameter $D_1$. The one or more discharge fluid flow apertures 36A can extend at the same angle as the discharge channels to which the one or more discharge fluid flow apertures 36A correspond. Similarly, the one or more supply fluid flow apertures 34A can extend that the same angle as the supply channels to which the one or more discharge fluid flow apertures 36A correspond. Further, in some embodiments, both the one or more discharge fluid flow apertures 36A and one or more supply fluid flow apertures 34A can be on the same half of the sleeve. For example, a centerline of a discharge fluid flow aperture 36A and a centerline of a fluid flow aperture 34A can form an angle that is less than about 180°. For example, in some embodiments, a centerline of a discharge fluid flow aperture 36A and a centerline of a fluid flow aperture 34A can form an angle of about 90°. In some embodiments, the supply fluid flow aperture 34A can be directly in line with (i.e., about 180°) from the discharge fluid flow aperture 36A.

At least one of the first and second collars $38A_1$, $38A_2$ can have at least one groove 35 at the first end 31 or second end 33 of the body 50 on an outer circumference OC of the respective collar 31, 33 that can be aligned with a groove in an indention in a screen changer housing to form an aperture for receiving a locking pin to ensure proper alignment of the sleeve 30A within the screen changer housing. In some embodiments, when installed within a modular continuous screen changer, the body 50 and collars $38A_1$, $38A_2$ of the sleeve 30A can be configured to expand when heated within the screen changer housing to create a compression fit within a sleeve-receiving bore, respectively, formed by first and second body halves of the screen changer housing.

Figure 10A:
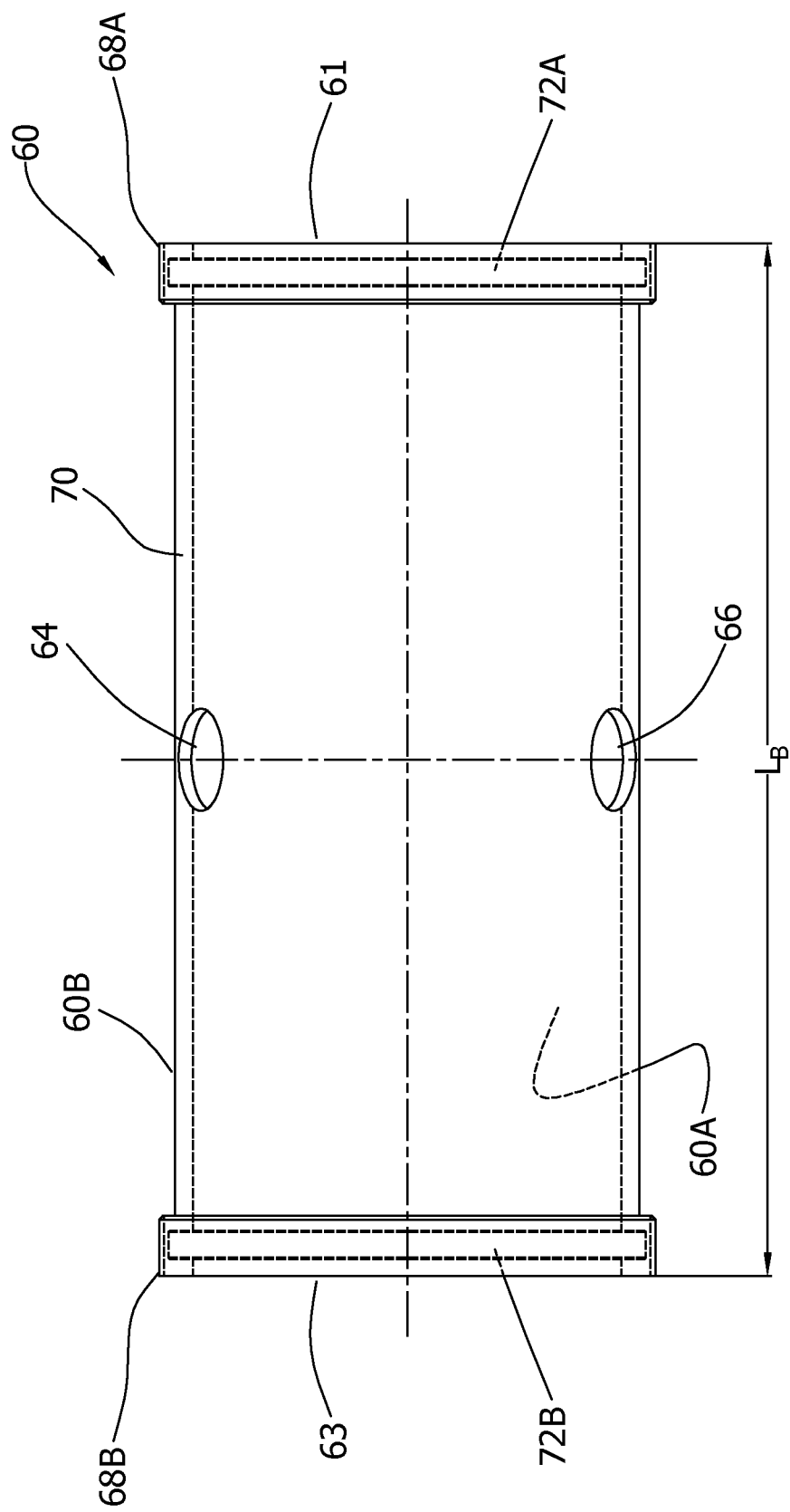
FIG. 10A illustrates a side plan view of another embodiment of a sleeve that can be used in a modular continuous screen changer, the sleeve having a seal groove in each collar for accepting low-viscosity seals according to the present subject matter.
Figure 10B:
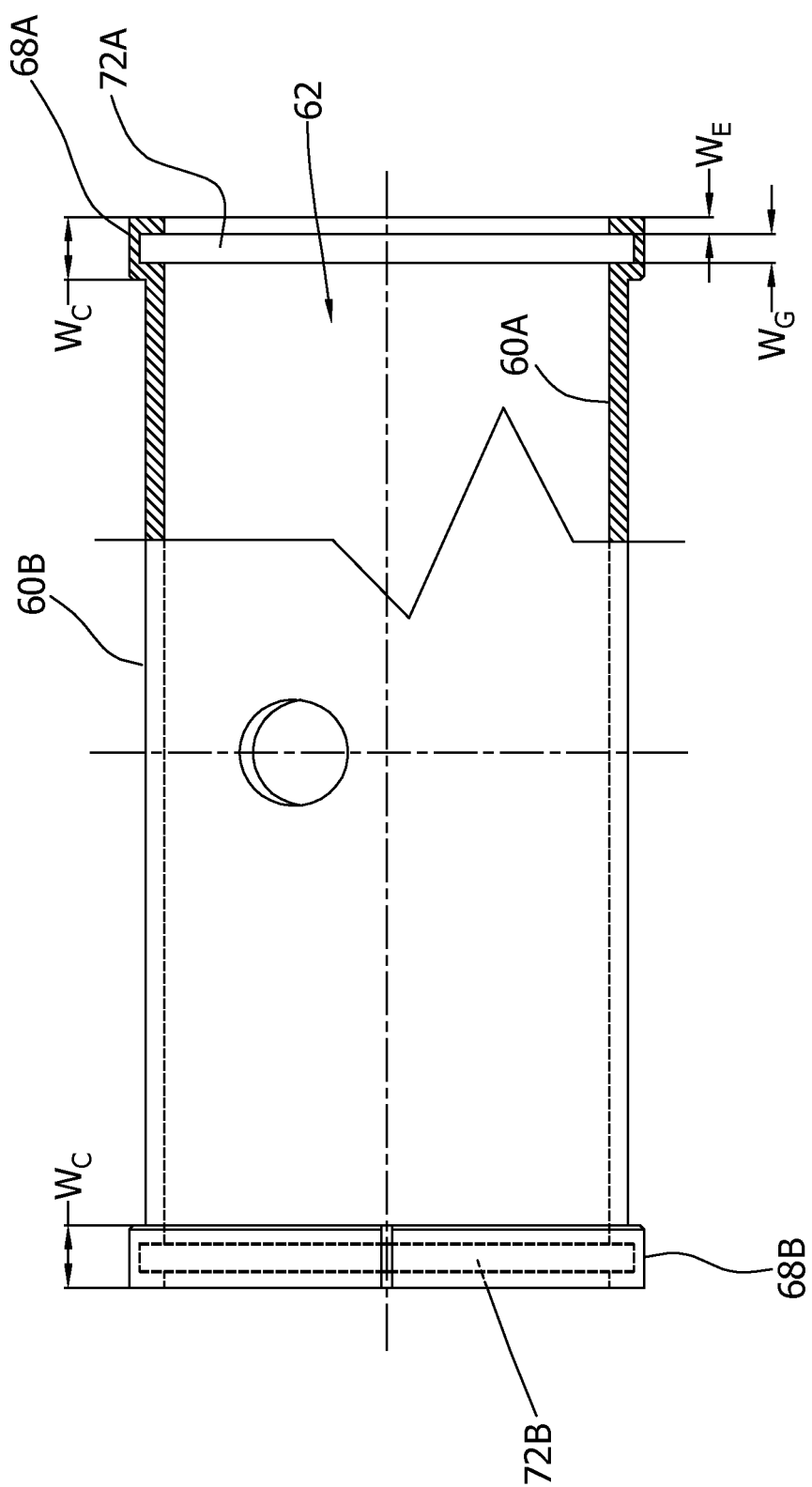
FIG. 10B illustrates a partial cross-sectional side plan view of the embodiment of the sleeve according to FIG. 10A showing the seal groove in the partial cross section.

As stated above, an interior wall of a body of a sleeve can have one or more grooves therein for receiving seals for low-viscosity fluids to facilitate the processing of the fluids. For example, as shown in FIGS. 10A and 10B, a sleeve 60 can be provided that can be configured to receive a screen-bearing piston within a fluid processing apparatus, such as modular screen changer for use in fluid processing systems. The sleeve 60 can comprise a cylindrical body 70 having a first end 61 and a second end 63. The body 70 of the sleeve 60 forms a piston pathway, or piston receiving aperture, 62 for receiving a piston that can direct the flow of fluid through the fluid processing apparatus in which it is used. For example, the body 70 can comprise an exterior wall 60B and an interior wall 60A that defines the piston receiving aperture 62 through the body 70. One or more supply fluid flow apertures 64 can extend through the interior wall 60A and exterior wall 60B of the body 70. Similarly, one or more discharge fluid flow apertures 66 can extend through the interior wall 60A and the exterior wall 60B of the body 70. The one or more discharge fluid flow apertures 36A can be aligned with the one or more supply fluid flow apertures 34A. The sleeve 60 can comprise a first collar 68A extending radially outward from the exterior wall 60B at the first end 61 of the body 60 and a second collar 68B extending radially outward from the exterior wall 60B at the second end 63 of the body 70.

The interior wall 60A can be configured for receiving seals for low-viscosity fluids. For example, the sleeve 60 can comprise grooves 72A, 72B within an interior wall 60A for receiving seals for low-viscosity fluids, such as a low-viscosity polymer. For instance, in some embodiments, the interior wall 60A of the body 70 can have a groove 72A proximal to the first end 61 of the body 70 beneath the first collar 68A and a groove 72B proximal to the second end 63 of the body 70 beneath the second collar 68B. In particular, the collars 68A, 68B can have a width $W_C$ that can be wide enough to have grooves 72A, 72B that can have a width $W_G$ therein that can accommodate low-viscosity seals, such as seals disclosed in U.S. Pat. No. 9,309,974, which is incorporated herein in its entirety. In such embodiments, the outer edges of the collars 68A, 68B can have a width $W_E$ to be at the ends 61, 63 of the body 70 that can hold the seals in place while withstanding the forces placed thereupon by the tight fit of the piston that operates within the piston receiving aperture 62. When installed within a fluid processing apparatus, the body 70 of the sleeve 60 with the collars 68A, 68B can be configured to have a length $L_B$ that can extend across the length of the portion of the modular fluid processing apparatus in which the piston operates such that the body halves that comprise the housing of the modular fluid processing apparatus do not directly engage the piston that operates within the sleeve 60.

Figure 11A:
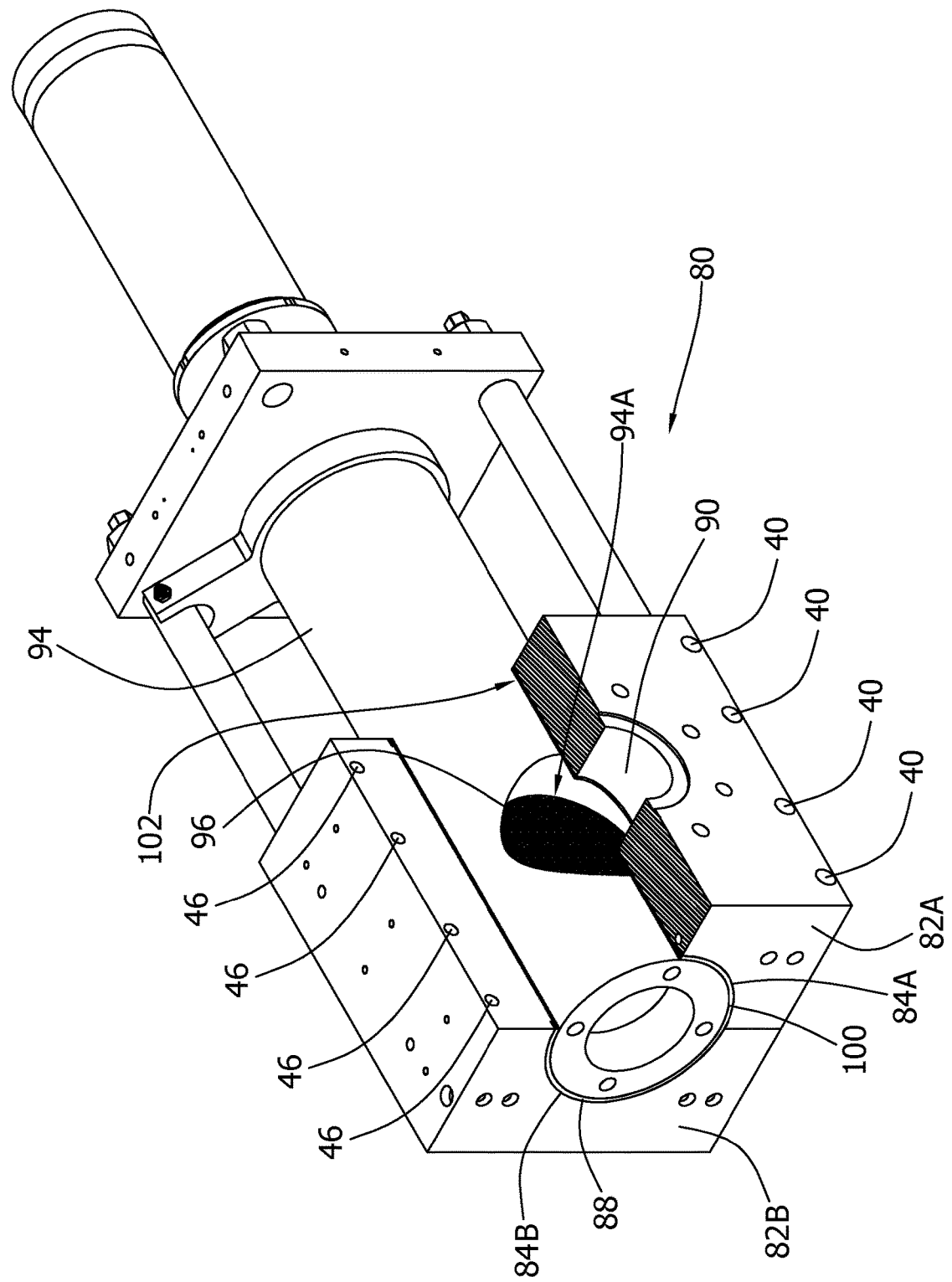
FIG. 11A illustrates a perspective partial cross-sectional view of an embodiment of a modular discontinuous screen changer according to the present subject matter.
Figure 11B:
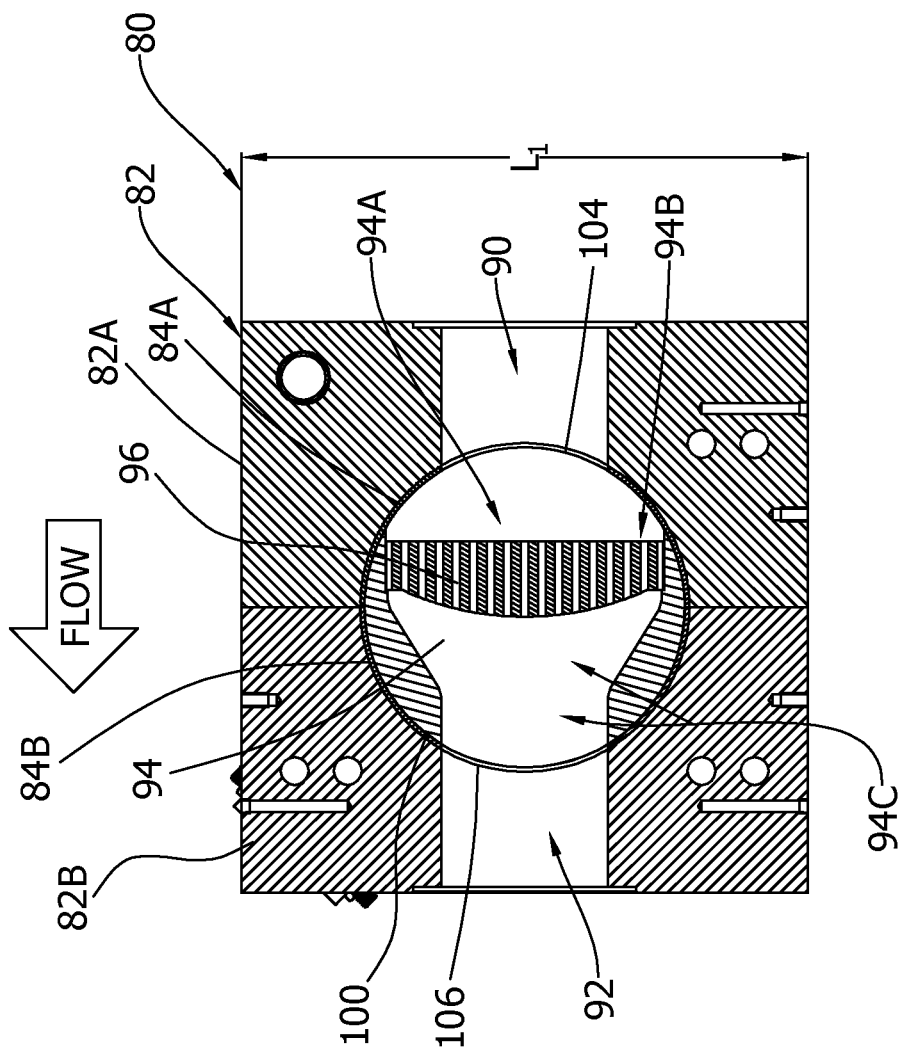
FIG. 11B illustrates a full cross-sectional view of the embodiment of the modular discontinuous screen changer according to FIG. 11A along the direction of fluid flow.

Referring to FIGS. 11A and 11B, an embodiment of another fluid processing apparatus is provided in the form of a modular discontinuous screen changer, generally designated 80. Unlike a continuous screen changer described above, the processing of the fluid stops when the screen pack within the screen changer 80 is to be changed. Alternatively, a diverter valve can be used upstream in the fluid processing system to divert the flow of the fluid during the screen change. The modular discontinuous screen changer 80 can comprise a screen changer housing 82 that can include a first body half 82A and a second body half 82B that can be secured together for filtration operations. The first body half 82A can have a single open half-circular bore 84A that extends along a length $L_1$ of the first body half 82A and the second body half 82B can have a single open half-circular bore 84B that extends along a length (not shown) of the second body half 82B. When the first and second body halves 82A, 82B are secured together to form the screen changer housing 82, the open half-circular bore 84A in the first body half 82A can be aligned with the open half-circular bore 84B in the second body half 82B to form a full-circular sleeve-receiving bore 88 as seen in FIG. 11A.

As shown in FIGS. 11A and 11B, the embodiment of the discontinuous screen changer housing 82 can comprise a main supply channel 90 configured in the first body half 82A and a main discharge channel 92 configured in the second body half 82B. Fluids being processed in the fluid processing system, such as a polymer in liquid form, can pass through the main supply channel 90 in the first body half 82A of the modular discontinuous screen changer 80 to be filtered before passing through the main discharge channel 92 in the second body half 82B of the modular discontinuous screen changer 80 for further processing downstream of the modular discontinuous screen changer 80 within the fluid processing system.

The modular continuous screen changer 80 can comprise can also comprise a screen-bearing piston 94. The screen-bearing piston 94 can comprise a filter screen cavity 94A for supporting filter screens, or screen packs. In particular, the filter screen cavity 94 can be configured to receive a filter screen, or screen pack, 96 as well as a breaker plate and a screen retention plate (not identified in the Figures). The filter screen cavity 94A in the screen-bearing pistons 94 can each comprise a screen pocket 94B on the supply channel side for receiving the screen pack 96 and that can be aligned with the supply channel 90 for supplying fluid to be filtered. The filter screen cavity 94A in the screen-bearing piston 94 can also comprise a discharge channel 94C that can be aligned with the discharge channel 92 for discharging the filtered fluid downstream in a fluid processing system.

To hold the piston 94 within the screen changer housing 82 and provide a tight metal to metal contact fit that allows movement of the piston 94 within the modular discontinuous screen changer 80 while minimizing leaks of the fluid being processed, the modular screen changer 80 can have a sleeve 100 that can reside within the sleeve-receiving bore 88 formed by the body halves 82A, 82B of the screen changer housing 82. The sleeve 100 can be secured between the first body half 82A and the second body half 82B within the first sleeve-receiving bore 88 to form a piston pathway 102 within the screen changer housing 82 for receiving the piston 94. The sleeve 100 can comprise a supply aperture 104 that can be aligned with the supply channel 90 in the first body half 82A of the screen changer housing 82 to allow fluid to pass through the filter screen cavity 94A of the screen-bearing piston 94. The sleeve 100 can also comprise a discharge aperture 106 that can be aligned with the discharge channel 92 in the second body half 82B of the screen changer housing 82 when the 1 sleeve 100 is properly aligned within the full-circular sleeve-receiving bore 88.

As above, the sleeve 100 can comprise a stronger and more heat resistant metal that can more closely mirror the metallurgy of the piston 94 as compared to the metal used to form the first and second body halves 82A, 82B of the screen changer housing 82. In this manner, a cheaper metal can be used for the first and second body halves 82A, 82B of the screen changer housing 82 as compared to the sleeve 100 while still providing a modular discontinuous screen changer 80 that produces quality filtered fluids and that can be cheaper to make and cheaper and easier to clean and repair. For example, in some embodiments, first and second body halves 82A 82B of the screen changer housing 82 can comprise a metal that is a lower grade metal than the metal used to form the sleeve 100. For example, first and second body halves 82A, 82B can comprise a metal that is not heat-treated post-machining.

As in previous embodiments, the first body half 82A can comprise first connection apertures 40 and the second body half 82B comprise second connection apertures 46. In some embodiments, the first connection apertures 40 can extend through the first body half 82A, while the second connection apertures 46 can extend into but not through the second body half 82B. The first and second connection apertures 40, 46 of the respective body halves 82A, 82B can be positioned above and below the full-circular sleeve-receiving bore 88 and can be aligned to receive bolts for securing the first and second body halves together to form a tight metal to metal fit between the body halves 82A, 82B and the sleeve 100 as described above.

Figure 12A:
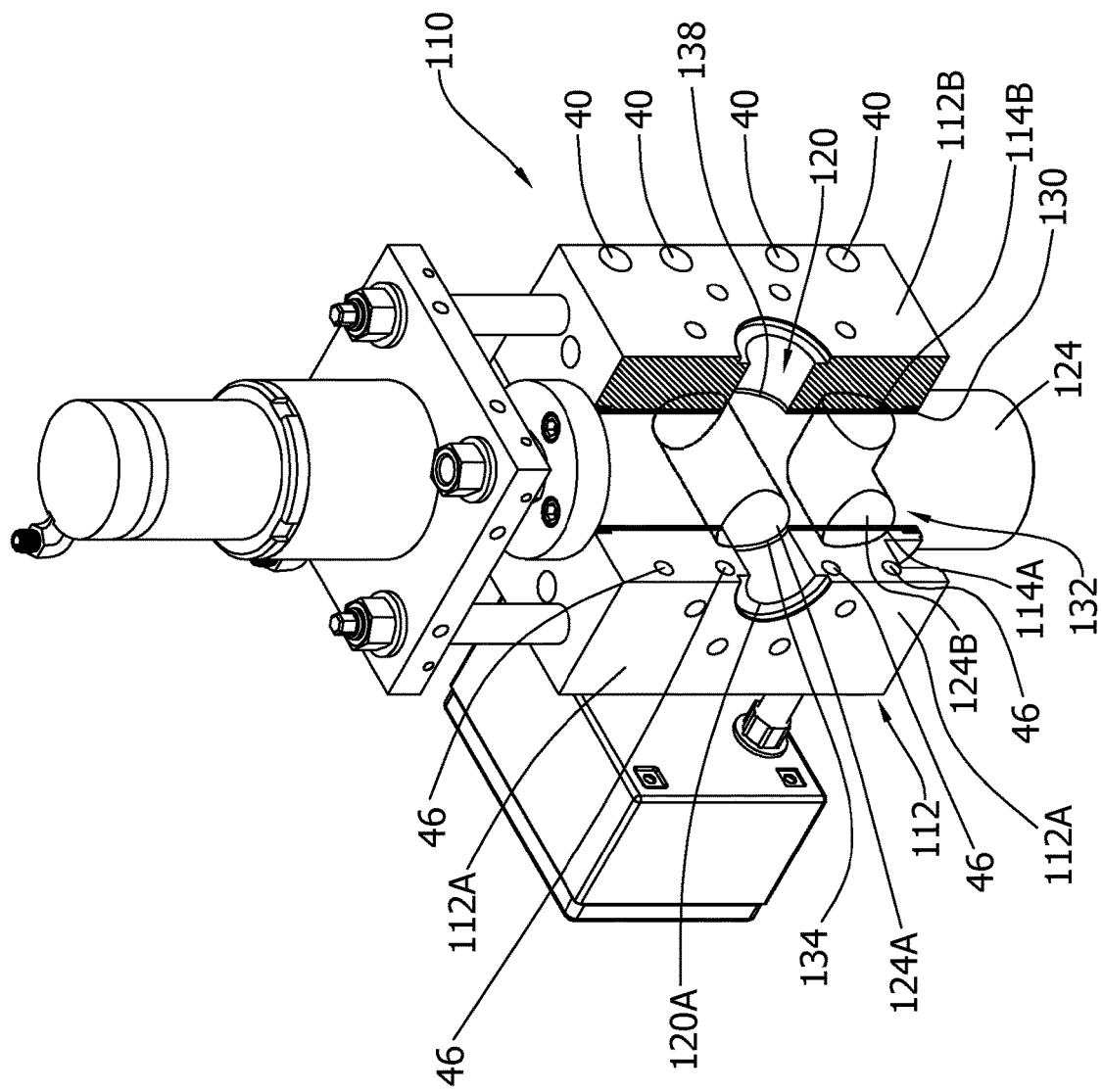
FIG. 12A illustrates a perspective partial cross-sectional view of an embodiment of a diverter valve according to the present subject matter with a piston in a fluid process flow through position.
Figure 12B:
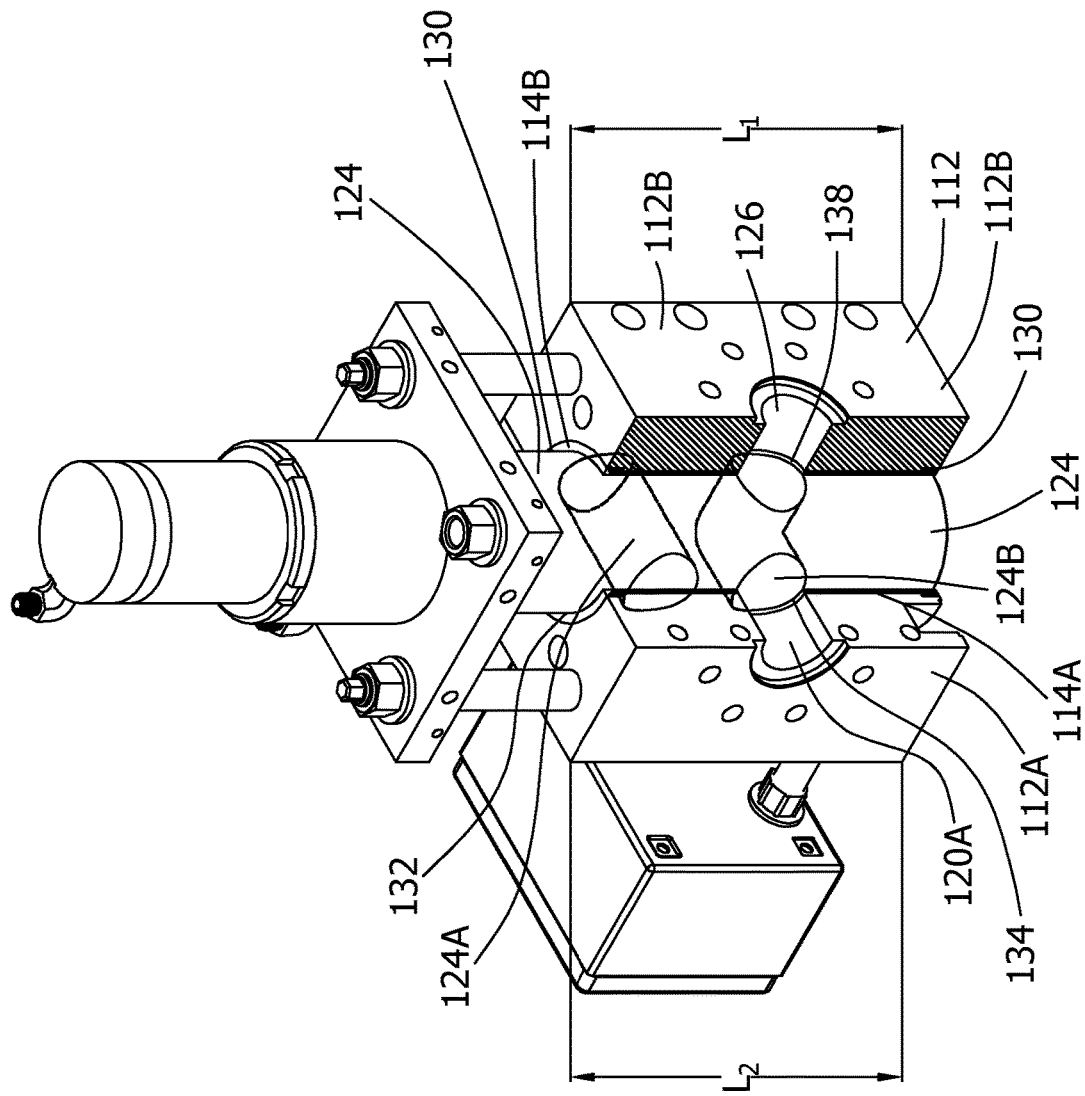
FIG. 12B illustrates a perspective partial cross-sectional view of the embodiment of a diverter valve according to FIG. 12A with the piston in a diverting position.

Referring to FIGS. 12A and 12B, another embodiment of a fluid processing apparatus in the form of a modular diverter valve, generally designated 110, is provided. Such a diverter valve 110 can be used upstream in the fluid processing system to divert the fluid flowing during the processing of the fluid within the system to allow a task to be performed on equipment downstream in the fluid processing system. For example, the diverter valve 110 can be used upstream in the fluid processing system to divert the fluid during a die change or a screen change. As with the other fluid processing apparatuses described herein, the modular diverter valve 110 can comprise a diverter housing 112 that can include a first body half 112A and a second body half 112B that can be secured together to for the diverter housing 112. The first body half 112A can have an open half-circular bore 114A that extends along a length $L_1$ of the first body half 112A and the second body half 112B can have an open half-circular bore 114B that extends along a length $L_2$ of the second body half 112B. When the first and second body halves 112A, 112B are secured together to form the diverter housing 112, the open half-circular bore 114A in the first body half 112A can be aligned with the open half-circular bore 114B in the second body half 112B to form a full-circular first sleeve-receiving bore 118.

Further, the first body half 112A can have an open half-circular supply bore 120A that extends perpendicular to the open half-circular bore 114A of the first body half 112A on a supply side 112C of the diverter housing 112 and the second body half 112B can have an open half-circular supply bore (not shown) that extends perpendicular to the open half-circular bore 114B of the second body half 112B on a supply side 112C of the diverter housing 112. Similarly, the first body half 112A can have an open half-circular discharge bore (not shown) that extends perpendicular to the open half-circular bore 114A of the first body half 112A on a discharge side 112D of the diverter housing 112 and the second body half 112B can have an open half-circular discharge bore (not shown) that extends perpendicular to the open half-circular bore 114B of the second body half 112B on a discharge side 112D of the diverter housing 112. When the first and second body halves 112A, 112B are secured together to form the diverter housing 112 the open half-circular supply bore 120A in the first body half 112A can be aligned with the open half-circular supply bore 120B in the second body half 112B to form a full-circular supply bore and the open half-circular discharge bore in the first body half 112A can be aligned with the open half-circular discharge bore in the second body half 112B to form a full-circular discharge bore. Additionally, the second body half 112B of the diverter housing 112 can have a diverting bore 126 therein through which fluid being diverted can be discharged.

The modular diverter valve 110 can comprise can also comprise a flow directing piston 124. The flow directing piston 124 can comprise a process flow-through pathway aperture 124A that directs fluid passing therethrough on to the next fluid processing apparatus within the fluid processing line or system. Further, the flow directing piston 124 can comprise a process flow diverting pathway aperture 124B that directs fluid out of the fluid processing line or system by directing the flow of fluid transverse to the flow through pathway, such as at a right angle. In particular, when the piston 124 is extended so that the process flow-through pathway aperture 124A aligns with the full-circular supply bore and full-circular discharge bore formed by the first and second body halves 112A, 112B of the diverter housing 112, the fluid being processed flows through the modular diverter valve 110 and out the full-circular discharge bore and on to the next fluid processing apparatus within the process line. When the piston 124 is retracted so that the process flow-diverting pathway aperture 124B aligns with the full-circular supply bore formed by the first and second body halves 112A, 112B of the diverter housing 112, the process flow-diverting pathway aperture 124B bends within the piston 124 such that the other end of the process flow-diverting pathway aperture 124B aligns with the diverting bore 126 in the second body half 112B of the diverter housing 112. Thereby, the fluid being processed flows through the modular diverter valve 110 and out of the diverting bore 126 so that the fluid is not flowing on to the next fluid processing apparatus within the process line to allow for maintenance or other procedures to be performed on one or more of the downstream fluid processing apparatuses.

To hold the flow directing piston 124 within the diverter housing 112 and provide a tight metal to metal contact fit that allows movement of the flow directing piston 124 within the modular diverter valve 110 while minimizing leaks of the fluid being processed, the modular diverter valve 110 can have a sleeve 130 that can reside within the sleeve-receiving bore 118 formed by the body halves 112A, 112B of the diverter housing 112. The sleeve 130 can be secured between the first body half 112A and the second body half 112B within the first sleeve-receiving bore 118 to form a first piston pathway 132 within the diverter housing 112 for receiving the piston 124. The sleeve 130 can comprise a supply aperture 134 that can be aligned with the supply channel formed by the first and second body halves 112A, 112B of the diverter housing 112 to allow fluid to pass either the process flow-through pathway aperture 124A or the process flow-diverting pathway aperture 124B depending on the alignment of the piston 124 when the sleeve 130 is properly aligned within the full-circular sleeve-receiving bore 118. The sleeve 130 can also comprise a discharge aperture 136 that can be aligned with the discharge channel formed by the first and second body halves 112A, 112B of the diverter housing 112 to pass fluid from the process flow-through pathway aperture 124A on to the next processing apparatus within the fluid processing line. Additionally, the sleeve 130 can further comprise a diverting aperture 138 that can be aligned with the diverting bore 126 in second body half 112B of the diverter housing 112 to pass fluid diverted from process flow-diverting pathway aperture 124B out of the fluid processing line.

As above, the sleeve 130 can comprise a stronger and more heat resistant metal that can more closely mirror the metallurgy of the piston 124 as compared to the metal used to form the first and second body halves 112A, 112B of the diverter housing 112. In this manner, a cheaper metal can be used for the first and second body halves 112A, 112B of the screen changer housing 112 as compared to the sleeve 130 while still providing a modular diverter valve 110 that produces quality filtered fluids and that can be cheaper to make and cheaper and easier to clean and repair. For example, in some embodiments, first and second body halves 112A, 112B of the diverter valve 110 can comprise a metal that is a lower grade metal than the metal used to form the sleeve 100. For example, first and second body halves 112A, 112B can comprise a metal that is not heat-treated post-machining.

As in previous embodiments, the first body half 112A can comprise first connection apertures 40 and the second body half 112B comprise second connection apertures 46. In some embodiments, the first connection apertures 40 can extend through the first body half 112A, while the second connection apertures 46 can extend into but not through the second body half 112B. The first and second connection apertures 40, 46 of the respective body halves 112A, 112B can be positioned on either side of the full-circular sleeve-receiving bore 118 and can be aligned to receive bolts for securing the first and second body halves together to form a tight metal to metal fit between the body halves 112A, 12B and the sleeve 130 as described above.

Thus, the disclosure herein provides fluid processing apparatuses, such as modular screen changers and diverter valves as well as modular components and related methods. A fluid processing apparatus for use in fluid processing systems can include a housing comprising a first body half and a second body half that are secured together. The first body half can have one or more half bores that extends along a length of the first body half and the second body half can have a one or more half bores that extends along a length of the second body half with the one or more half bores in the first body half aligning with the one or more half bores in the second body half to form one or more full circular first sleeve-receiving bores. The fluid processing apparatus can include one or more sleeves that is securable between the first body half and the second body half within the one or more sleeve-receiving bores to form one or more piston pathways within the housing for receiving one or more pistons.

Additionally, as described in detail above, different methods related to the modular fluid processing apparatuses are provided. For example, methods of assembly and/or repair are provided that allow for the sleeves to be installed in the modular fluid processing apparatus housing and/or be replaced by having sleeves that need replacement, such as damaged or defective sleeves, to be removed and new sleeves to be installed. In some, a method for assembling a modular fluid processing apparatus for use in a fluid processing system can be provided. The method can comprise providing one or more sleeves and a first body half and a second body half of a housing of the modular fluid processing apparatus. The first body half can have one or more half bores that extend along a length of the first body half and the second body half can have one or more half bores that extend along a length of the second body half with the half bore in the first body half. The method can also comprise aligning the first body half and the second body half such that the one or more half bores in the first body are aligned with the one or more half bores in the second body half so that one or more full first sleeve-receiving bores will be formed. The one or more sleeves can be placed, respectively, between the one or more half bores in the first and second body halves. For example, the one or more sleeves can be placed in the one or more half bores in the first and second body halves so that the one or more sleeves are properly aligned with the one or more full sleeve-receiving bores being formed by the one or more half bores in the first and second body halves.

The first body half and the second body half can then be secured together with the one or more sleeves within the respective one or more full sleeve-receiving bores to form one or more piston pathways within the housing for receiving one or more pistons. The first body half and the second body half can be secured in different manners as described above. For example, in some embodiments, the first body half and the second body half can be secured together by inserting bolts in first connection apertures of the first body half and second connection apertures in the second body half for securing the first and second body halves together in a line to line fit between the first and second body halves and the sleeve.

In some embodiments, the assembly method can comprise inserting the one or more pistons into the respective one or more sleeves. In some embodiments, one or more low-viscosity seals can be inserted in one or more grooves in an interior wall of each of the one or more sleeves to aid sealing the pistons inserted in the one or more sleeves. Other additional steps that can be performed in such assembly and/or repair methods are also described above.

In some embodiments where the assembly method includes a repair aspect, the method can include unfastening the first body half and the second body half from each other and removing the one or more sleeves from the respective one or more half bores in the first second body halves. The one or more sleeves can be replaced with new sleeves following the steps of the method of assembly outline above and as described in the description provided above.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole or in part. Furthermore, those of ordinary skill in the art will appreciate that the foregoing description is example and is not intended to limit the present subject matter.

What is claimed is:

1. A modular fluid processing apparatus for use in a fluid processing system, the modular fluid processing apparatus comprising:
a housing comprising a first body half and a second body half that are secured together, the first body half having a half bore that extends along a length of the first body half and the second body half having a half bore that extends along a length of the second body half with the half bore in the first body half aligned with the half bore in the second body half to form a full first sleeve-receiving bore;
a sleeve comprising a metal that is heat-treated post machining of the sleeve to withstand the heat and pressures of a fluid processing line, the sleeve being securable between the first body half and the second body half within the sleeve-receiving bore to form a piston pathway within the housing for receiving a piston.

2. The modular fluid processing apparatus according to claim 1, wherein the first and second body halves comprise a metal that is a lower grade metal than the metal used to form the sleeve.

3. The modular fluid processing apparatus according to claim 1, wherein the sleeve comprises one or more grooves within an interior wall for receiving seals for a low-viscosity fluid.

4. The modular fluid processing apparatus according to claim 1, wherein the sleeve comprises a first metal and the first and second body halves comprise a second metal, with the first metal having a different expansion rate than the second metal.

5. The modular fluid processing apparatus according to claim 4, wherein the expansion rate of the metal of the sleeve is the same as the expansion rate of the metal of a piston of the modular fluid processing apparatuses that is insertable into the sleeve.

6. The modular fluid processing apparatus according to claim 1, wherein the first and second body halves comprise a metal that is not heat-treated post machining.

7. The modular fluid processing apparatus according to claim 1, wherein the sleeve comprises a collar that extends around a first end of the sleeve and a collar that extends around a second opposing end of the sleeve.

8. A modular screen changer for use in a fluid processing system, comprising:
a screen changer housing comprising a first body half and a second body half that are secured together, the first body half having a first open half bore that extends along a length of the first body half and the second body half having a first open half bore that extends along a length of the second body half with the first open half bore in the first body half aligning with the first open half bore in the second body half to form a full first sleeve-receiving bore;
a first sleeve comprising a metal that is heat-treated post machining of the sleeve to withstand the heat and pressures of a fluid processing line, the first sleeve being securable between the first body half and the second body half within the first sleeve-receiving bore to form a first piston pathway within the screen changer housing for receiving a first piston;
the first body half having a second open half bore that extends along the length of the first body and the second body half having a second open half bore that extends along the length of the second body half with the second open half bore in the first body half aligning with the second open half bore in the second body half to form a full second sleeve-receiving bore; and
a second sleeve comprising a metal that is heat-treated post machining of the sleeve to withstand the heat and pressures of a fluid processing line, the second sleeve being securable between the first body half and the second body half within the second sleeve-receiving bore to form a second piston pathway within the screen changer housing for receiving a second piston.

9. The screen changer according to claim 8, wherein the first and second body halves comprise a metal that is a lower grade metal than the metal used to form the first and second sleeves.

10. The screen changer according to claim 8, wherein the screen changer housing comprises a main supply channel configured in the first body half and a main discharge channel configured in the second body half.

11. The screen changer according to claim 10, wherein a portion of the main supply channel is divided into a first supply sub-channel that extends into the first open half bore of the first body half and a second supply sub-channel that extends into the second open half bore of the first body half; and
a portion of the main discharge channel is divided into a first discharge sub-channel that extends into the first open half bore of the second body half and a second discharge sub-channel that extends into the second open half bore of the second body half.

12. The screen changer according to claim 11, wherein the first sleeve comprises a supply aperture that is alignable with the first supply sub-channel in the first body half of the screen changer housing and a discharge aperture that is alignable with the first discharge sub-channel in the second body half of the screen changer housing when the first sleeve is properly aligned within the first sleeving-receiving bore; and
the second sleeve comprises a supply aperture that is alignable with the second supply sub-channel in the first body half of the screen changer housing and a discharge aperture that is alignable with the second discharge sub-channel in the second body half of the screen changer housing when the second sleeve is properly aligned within the second sleeving-receiving bore.

13. The screen changer according to claim 8, wherein the first and second sleeves are configured to expand when heated within the screen changer housing to create a compression fit within the first and second sleeve-receiving bores, respectively, formed by the first and second body halves.

14. The screen changer according to claim 8, wherein the first and second sleeves comprise grooves within an interior wall for receiving seals for a low-viscosity fluid.

15. The screen changer according to claim 8, wherein the first body half comprises first connection apertures and second body half comprises second connection apertures, the first and second connection being alignable to receive bolts for securing the first and second body halves together in a line to line fit between the body and the sleeve.

16. The screen changer according to claim 8, wherein the first and second sleeves comprise a first metal and the first and second body halves comprise a second metal, with the first metal having a different expansion rate than the second metal.

17. A modular fluid processing apparatus for use in a fluid processing system, the modular fluid processing apparatus comprising:

a housing comprising a first body half and a second body half that are secured together, the first body half having a half bore that extends along a length of the first body half and the second body half having a half bore that extends along a length of the second body half with the half bore in the first body half aligned with the half bore in the second body half to form a full first sleeve-receiving bore;

a sleeve being securable between the first body half and the second body half within the sleeve-receiving bore to form a piston pathway within the housing for receiving a piston, the sleeve comprising one or more grooves within an interior wall for receiving seals for a low-viscosity fluid.

18. A modular fluid processing apparatus for use in a fluid processing system, the modular fluid processing apparatus comprising:

a housing comprising a first body half and a second body half that are secured together, the first body half having a half bore that extends along a length of the first body half and the second body half having a half bore that extends along a length of the second body half with the half bore in the first body half aligned with the half bore in the second body half to form a full first sleeve-receiving bore;

a sleeve being securable between the first body half and the second body half within the sleeve-receiving bore to form a piston pathway within the housing for receiving a piston, the sleeve comprising a first metal and the first and second body halves comprise a second metal, with the first metal having a different expansion rate than the second metal.

19. The modular fluid processing apparatus according to claim 18, wherein the expansion rate of the metal of the sleeve is the same as the expansion rate of the metal of a piston of the modular fluid processing apparatuses that is insertable into the sleeve.

20. The modular fluid processing apparatus according to claim 18, wherein the sleeve comprises one or more grooves within an interior wall for receiving seals for a low-viscosity fluid.

* * * * *